(12) United States Patent
Dowling et al.

(10) Patent No.: US 8,279,479 B2
(45) Date of Patent: *Oct. 2, 2012

(54) NETWORK SCANNER FOR GLOBAL DOCUMENT CREATION, TRANSMISSION AND MANAGEMENT

(76) Inventors: Eric Morgan Dowling, Escazu (CR); Robert A Westerlund, Jupiter, FL (US)

( * ) Notice: Subject to any disclaimer, the term of this patent is extended or adjusted under 35 U.S.C. 154(b) by 440 days.

This patent is subject to a terminal disclaimer.

(21) Appl. No.: 12/656,658

(22) Filed: Feb. 12, 2010

(65) Prior Publication Data

US 2010/0141993 A1  Jun. 10, 2010

Related U.S. Application Data

(63) Continuation of application No. 10/948,213, filed on Sep. 24, 2004, now Pat. No. 7,672,003, which is a continuation-in-part of application No. 10/930,821, filed on Sep. 1, 2004, now Pat. No. 7,451,921.

(51) Int. Cl.
*G06F 3/12* (2006.01)
(52) U.S. Cl. ...... 358/1.15; 358/1.16; 358/403; 358/442; 709/203; 709/249; 379/100.01; 379/211.01
(58) Field of Classification Search .................. 358/1.15, 358/1.16, 402, 403, 442, 501; 709/203, 352, 709/249, 226, 217, 204, 223, 207; 379/100.01, 379/211.01, 100.08, 88.03
See application file for complete search history.

(56) References Cited

U.S. PATENT DOCUMENTS

| | | | | |
|---|---|---|---|---|
| 6,633,833 B2 * | 10/2003 | Sharma et al. | ................ | 702/188 |
| 6,671,741 B1 * | 12/2003 | Dillon | ........................... | 709/250 |
| 6,836,789 B1 * | 12/2004 | Toyoda | ........................ | 709/206 |
| 7,130,466 B2 * | 10/2006 | Seeber | ........................ | 382/218 |
| 7,237,264 B1 * | 6/2007 | Graham et al. | ................. | 726/23 |
| 7,340,776 B2 * | 3/2008 | Zobel et al. | ...................... | 726/24 |
| 7,496,558 B2 * | 2/2009 | Weiss et al. | ........................... | 1/1 |
| 7,499,590 B2 * | 3/2009 | Seeber | ........................ | 382/218 |
| 7,536,456 B2 * | 5/2009 | Williams et al. | ............. | 709/224 |

* cited by examiner

*Primary Examiner* — Negussie Worku
(74) *Attorney, Agent, or Firm* — Eric M. Dowling; Robert A. Westerlund

(57) ABSTRACT

A network scanner, communication protocols, and client and server programs and are provided which provide an improved way to transmit legally binding documents, obviating the need for outmoded, legacy fax transmissions. Using the network scanner, a document may be scanned and transferred directly into any shared folder inbox residing on any computer attached to the Internet. Enhanced server systems and network communications and messaging protocols are provided that are more practical to use than email for sending documents such as executed legal documents or other documents requiring robust integrity and authenticatability. Similarly, the inventive network scanner, server systems and communication protocols provide improved ways to perform large file transfers and to manage bandwidth to minimize problems associated with uploading/downloading large files as attachments to/from email servers and for enabling user control over VoIP quality during file transmission sessions.

38 Claims, 6 Drawing Sheets

NETWORK SCANNER FOR GLOBAL DOCUMENT CREATION, TRANSMISSION AND MANAGEMENT

RELATED APPLICATIONS

The present application is a Continuation Application of U.S. patent application Ser. No. 10/948,213, filed Sep. 24, 2004, now U.S. Pat. No. 7,672,003 entitled "Network scanner for global document creation, transmission and management," which is a Continuation-In-Part (CIP) of U.S. patent application Ser. No. 10/930,821, filed Sep. 1, 2004, entitled "Methods, Smart Cards, and Systems for providing portable Computer, VoIP, and Application Services", now U.S. Pat. No. 7,451,921, the disclosure of which is herein incorporated by reference in its entirety. Applicants hereby claim the benefit of the earlier filing date of the above-referenced parent applications.

FIELD OF THE INVENTION

This invention relates generally to electronic document creation, storage, transmission, and management. More particularly, the invention relates to methods and systems for inputting printed paper ("hard copy") documents by scanning them into an electronic format and sending the resultant electronic documents to local storage and/or to a remote location.

BACKGROUND OF THE INVENTION

Fax technology has been in use now for several decades and allows paper documents to be scanned, digitized, and transported via analog telephone connections using the G3 fax protocols and modem technology. As the Internet grew to become ubiquitous, Internet based fax server technology was introduced in order to allow faxes to be received and forwarded to recipients via email.

Internet fax services, generically known as "efax" services, add many benefits beyond standard analog fax machines. Using these services, people can fax documents to a recipient's fixed published fax telephone number, but the fax can be received and printed out from any location in the world that provides Internet access. Further, such efax transmissions received over a broadband Internet connection do not tie up a telephone line during the reception of the fax, although the transmitting fax still ties up a telephone line and experiences the per-page telephonic transmission delay. Yet further, as long as the efax user has access to a scanner, efax services eliminate the need for a fax machine, provide superior image quality, and provide a host of other user/worker productivity/efficiency advantages. For example, with efax services, the user/worker need not worry about replacing the fax machine ink cartridge, reloading a document feeder tray, fax machine maintenance and repair, downtime due to fax machine malfunction, clearing paper jams, etc. In general, efax technology provides a faster, cheaper, superior, and more efficient way to create and transmit documents throughout the entire world, as compared to using conventional fax machines.

While efax technology is typically used to receive faxes (inbound technology, also known as "fax-to-email"), efax technology can also be used to send faxes (outbound technology, also known as "email-to-fax"). With email-to-fax technology, a subscriber typically sends an email with a scanned image file attachment (e.g., .tif or .pdf), to a subscriber's outbound fax-to-email address. When the email is received at this address, the server inspects the subject field for a telephone number and causes an outbound telephone call to be made to a fax machine, and the fax is transmitted via standard G3 fax signals to a recipient fax machine across the telephone network. The email-to-fax server system may be distributed and route the fax as an email to a local point of presence (POP) and make a local outbound fax call to minimize telephone toll charges.

A somewhat hybrid offshoot of the above technologies is called Emate technology. With Emate technology, special fax machines are used that allow a user to enter an email address into a fax machine, make a telephone call to a fax-to-email server, and transmit the fax using standard G3 type analog fax signals. A fax-to-email type server then receives the fax call, extracts the email address therefrom, converts the fax to an image file format (like .tif or .pdf), attaches the image file to an email, and sends the resultant efax to the specified recipient email address. Among other reasons, because the Emate solution requires a special type of fax machine, and further, still requires a fax-to-email server, this technology has not been widely adopted. Instead, fax-to-email services prevail in the marketplace, and users interested in receiving faxes as emails subscribe to such services, e.g., those offered by j2 Global Communications, Inc.

Throughout this application, it should be noted that an "image file" generally refers to a file in an image file format, such as a .pdf file or a .tif file. Often the image file is a bit mapped file (.bmp file). If OCR (optical character recognition) is used, the image file can be stored with less bits than a bit-mapped image, and can also be made searchable and computer manipulable.

Another presently available technology is a multifunction fax machine. A multifunction fax machine can be used as an ordinary fax machine to send fax messages using the G3 fax protocol across standard telephone lines. Similarly, the multifunction fax machine can be used as a printer, and also as a scanner. Typically, the resolution for copies is not as good as a standard copy machine, but this is an implementation issue. Multifunction fax machines find use mainly in small office/home office (SOHO) environments because there is typically limited space to house separate copy machines, printers and fax machines.

While these various hybrid Internet fax solutions have extended the life of fax technology, it has become apparent to the present inventors that fax technology is, in and of itself, dated and cumbersome. What is needed is a universal network-based scanning technology that can eliminate the need for fax machines altogether, enabling a new generation of enhanced document creation, delivery and management systems.

Modern computer technology offers many ways to attach electronic documents of all kinds to emails and to globally transmit them to end-user email accounts, and/or using FTP or other protocols. However, current computer technology is lacking in certain ways, and this void is still being filled by fax technology. Fax technology is still the accepted way of remotely and electronically executing legally binding documents like contracts, agreements and purchase orders. Using existing technology, scanners can be used to scan documents, and the scanned document can be attached to en email and sent from a computer to a destination email address. However, because computer technology can readily be used to alter documents in electronic form and is susceptible to hacking and spoofing, such documents are not as well trusted as documents faxed by legacy analog fax machines.

A recent addition to the field is a scanner system (or combined scanner system with any combination of the following extra functions: copier/printer/fax) where a user can drop a document into a paper feeder, enter a destination email address, and transmit the scanned document to the destination email address. This new functionality is called "scan-to-email." While such functionality is a step in the right direction, it is lacking in many ways. First of all, the scanner often creates large bitmap files. Bitmap files are often desired for electronically transmitted legal documents because they are not as readily computer manipulable as text based documents and therefore are perceived as being more secure.

When sending bitmapped images, the files rapidly become too large to be processed by an email server, so that, for example, a sender sending twenty or so color pages from a magazine, might have to break the scan job into fifteen separate email transmissions. If a large contract needs to be executed, even though it is in black and white, it would not be acceptable to break it into many pieces to make it fit through email. Because time is so expensive, a technology that requires both a sending operator and a recipient to wait long times for uploads and downloads may in some ways be worse than fax. At least with fax, the recipient can be doing something else while the fax comes in, assuming no paper jams and/or other fax machine malfunction and/or communication link failure occurs during the transmission.

Other important features are also missing from modern scanners that can be attached to networks and which have a scan-to-email capability. While user authentication is used to allow a user to enter an email account and other types of user accounts, no user authentication techniques have been combined with the scanner to positively identify a user and link the positively-identified user with a particular scanned document. There is a long-felt need for an improved computerized system for transmitting legally binding documents via electronic means other than costly and cumbersome fax technology, and this need is as yet unfilled, even by the current generation scan-to-email technology. Rather, legacy fax machines which are slow, costly, and of relatively poor image quality are still used to transmit documents. Fax machines allow a recipient to know where the fax came from (caller ID log), and also allow the sender to dial a telephone number, hear it ring, hear it pick up, hear the machines handshake, and see a transmission report message that indicates that all the pages were sent properly. The recipient exercises physical control over a hard copy document sent by analog fax means that went straight from paper to telephone signals and now to his/her fax paper output, so the user is more or less sure the fax was not altered electronically. Hence conventional analog fax transmissions are typically more trusted than scanned email attachments and, therefore, fax transmissions are still required by most companies to execute agreements, to send or receive purchase orders or purchase order modifications, and other documents which have evidentiary value and/or require a high level of document integrity.

For these reasons, in current practice, fax machines are often used to execute legal documents such as contracts. When the fax is received, the faxed signature is accepted as legally binding. However, in reality, this provides only a light form of security. For example, a signature could be taken from a first contract and pasted onto a second contract, copied, and then faxed. By simply cutting, pasting, and copying with a copy machine, a document can be easily forged and faxed. With the older analog fax technology, nobody really knows who actually created and/or faxed the document being transmitted. Also a forger can easily enter a false sending-fax telephone number to be printed on each received fax page. That is, while analog fax technology is accepted as legally binding, the inventors recognize that this is out of historical necessity for lack of a better technology, not for technical reasons.

In addition to the above-described drawbacks and shortcomings of current scan-to-email technology, such as the lack of sender authentication and the inefficiencies of large bitmap files, email is not an ideal medium for important business transactions because a user is never really sure the email ever got to its destination. Too many times a large attachment is sent and some email server along the way simply deletes it and never sends it on to its intended destination. Therefore no one can ever sure an email will get through to its intended destination, especially if there is a big file attachment. Nobody wants to send a fifty page contract and have no idea whether it was received without having to call the recipient and ask. Also, large documents often experience long email delays, so that even calling and asking for confirmation of receipt is not always effective.

Consider trying to file an IDS with the USPTO with 150 pages of references using scan-to-email technology as opposed to fax technology. With fax technology, this process would be so slow and onerous that most people would just send it through the mail. However if someone did spend the time to fax it, at least they would know, if there were no paper jams and/or communications glitches along the way that made them start over, that all the pages were received by the USPTO and would be filed. However, if scan-to-email technology were used and a USPTO email address were supplied to accept incoming documents, the sender would have no way to be sure the USPTO ever received the large email attachment. Although an auto-reply email function can be used to indicate receipt of the email message, there is presently no mechanism for the email recipient to automatically confirm receipt of any email attachment. Again, the practitioner would rather use regular mail than scan-to-email for this reason. Hence, there are significant improvements that need to be made before a technology like scan-to-email can receive widespread acceptance and ultimately become a global standard for document creation and delivery to replace fax technology in the marketplace.

What is missing in the art is a technology that can be used to securely scan documents and seamlessly transmit resulting image files to any location across the globe without the need to convert them to analog fax signals and to transmit them across the public switched telephone network (PSTN). It would be advantageous to be able to supply such functionality without the need to employ expensive fax server systems that use special purpose boards to receive fax signals via telephone lines and to convert the fax signals to image format files or FoIP (fax-over-IP) signals. It would be advantageous to be able to securely send laser quality documents to any point in the world. It would be advantageous to have a technology to securely execute documents to enter into legal contracts remotely. It would also be advantageous to have a technology which would enable the creation of a remotely transmittable electronic document having evidentiary integrity from a hard copy input document, preferably without the need for specialized infrastructure and/or specialized services for performing e-mail-to-fax and/or fax-to-e-mail conversions remotely of the point of creation of the transmittable document. It would be further advantageous to have a new technology that does not merely convert lower quality fax transmissions to image files and transmit them as attachments to emails, but rather starts from the ground up to provide a fully integrated global document creation and delivery system that uses existing Internet and/or other communications network transport protocols and new inventive application programs and protocols to integrate document creation and delivery with modern computer technology. It would be desirable to vastly improve upon the newly introduced scan-to-email technology to make it more convenient to use by providing improved user interfaces, improved network transmission methodology, confirmation of receipt by the recipient, and integrated document authentication, sender authentication, and security functions. It would be yet further advantageous to implement such a new technology in a network-sharable device, such as a "network scanner".

In sum, there presently exists in the art a need for an electronic document creation and delivery method which overcomes or minimizes the drawbacks and shortcomings of the presently available technology, and which provides some or all of the advantageous features described above which are presently missing from the art. The present invention addresses this need in the art.

SUMMARY OF THE INVENTION

In one of its aspects, the present invention encompasses a network scanner which includes an optical document scanning arrangement with a scanning surface for document scanning, an image digitizing subsystem operative to produce an image file from a set of one or more scanned pages, and a computerized subsystem including a processor, a memory, a network interface, an optional smart card interface, and computer software resident in the memory, such as application and communications software. A GUI is provided for facilitating human-machine interactions, including, for example, GUI functions which enable a user to control and manage the creation and transmission of electronic documents from source hard copy input documents. A network interface is provided for communicating across a computer network.

The present invention, in another of its aspects, encompasses inventive document transmission protocols which enable the provision of a new service, hereby dubbed "scan-to-folder", that allows a user to scan a document and have it inserted directly into a file folder in a computer located anywhere in the world. Among other advantages, this novel scan-to-folder service relieves the recipient of the need to wait for the scanned file to be downloaded from an email server and eliminates the uncertainty of email transmission due to the failure of intermediate email servers to properly forward or route the scanned file to the intended destination. The transmitted scanned file may be positively authenticated with a digital signature of the person sending the document to provide stronger sender authentication security than that provided by a fax caller-ID log. Also, in accordance with a preferred aspect of the inventive scan-to-folder protocols, a recipient protocol entity, after having received the document, sends back a confirmation report indicating the number of pages properly received, or optionally computes a cryptographic hash function (preferably using public-private key cryptology procedures) on the document and sends back a reduced size hash so the sender can be 100% sure the scan-to-folder document was received intact at the distant end and did not get "lost in the email" or corrupted or modified during transit.

The GUI preferably allows a user to specify a destination application layer Internet address such as an email or FTP or SIP address to which to send the scanned image via the network interface. A smart card interface is preferably also provided to accept a smart card that includes user authentication data. This allows users to digitally sign documents, log into VPN protected networks, and/or to supply user-specific data to the network scanner. For example a user may wish to access his/her personal email account and have access to address books and the like while operating the network scanner. A biometric security device may also or alternatively be incorporated into the network scanner to provide virtually inviolable authentication of the sender positively linked to documents transmitted by the authenticated sender for evidentiary and/or security purposes. Also, smartcardless embodiments are possible by having a user provide a user name and a password in order to facilitate access to user-specific information normally held on the smart card from a networked storage account.

The present invention solves many fundamental problems latent in the prior art. The network scanner of the present invention is especially useful in environments where broadband access is available. For example, the network scanner can be used in any environment where network access is available, such as in corporate LANs, home networked environments, or public WiFi hotspots. With the network scanner, a document can be loaded into a paper feeder, scanned, and transmitted to a local storage area, uploaded to a server, sent as an email attachment to a recipient, and/or can be coupled via a secure network session (over any wired or wireless communications network) to any type of server, PC, handheld device, workstation, storage-equipped Internet appliance, device, or equipment coupled to the Internet. Various authentication methods such as the use of smart cards, biometric IDs, server side certificate accounts requiring user name and password, digital signatures, and encryption may be seamlessly used to verify to the recipient that the scanned document was inserted into the scanner and/or sent by the person who correctly executed the scanned document. Hence, the present invention provides a much more secure and efficient way to execute legally binding documents remotely and electronically than is possible with prior art fax and/or scan-to-email based solutions. The alternate file, folder and document transmission protocols and methods disclosed herein will cut billions of hours per year that people would otherwise spend downloading file attachments from email servers or sending them via fax. Additionally, other aspects of the present invention, such as the security and receipt confirmation techniques, can be employed to vastly improve current scan-to-email systems, and to render such electronic document creation and delivery systems suitable for applications and uses which are currently only being met by conventional, analog fax technology, with all of its many drawbacks, disadvantages, and shortcomings.

BRIEF DESCRIPTION OF THE DRAWING

The various novel features of the invention are illustrated in the figures listed below and described in the detailed description which follows.

DETAILED DESCRIPTION OF THE INVENTION

This application is a continuation-in-part (CIP) of the presently U.S. patent application Ser. No. 10/930,821 entitled "METHODS, SMART CARDS, AND SYSTEMS FOR PROVIDING PORTABLE COMPUTER, VOIP, AND APPLICATION SERVICES", filed on Sep. 1, 2004 now U.S. Pat. No. 7,451,921, the disclosure of which is incorporated herein by reference in its entirety. All of the disclosure of the present application is explicitly combinable with the disclosure of the parent application to form various combinations of systems whereby the network scanner takes the place of or operates in conjunction with the VoIP or FoIP device in the parent application. Likewise, any of the network and server functions described in the parent application may be used to augment the network based systems and methods described herein.

Figure 1:
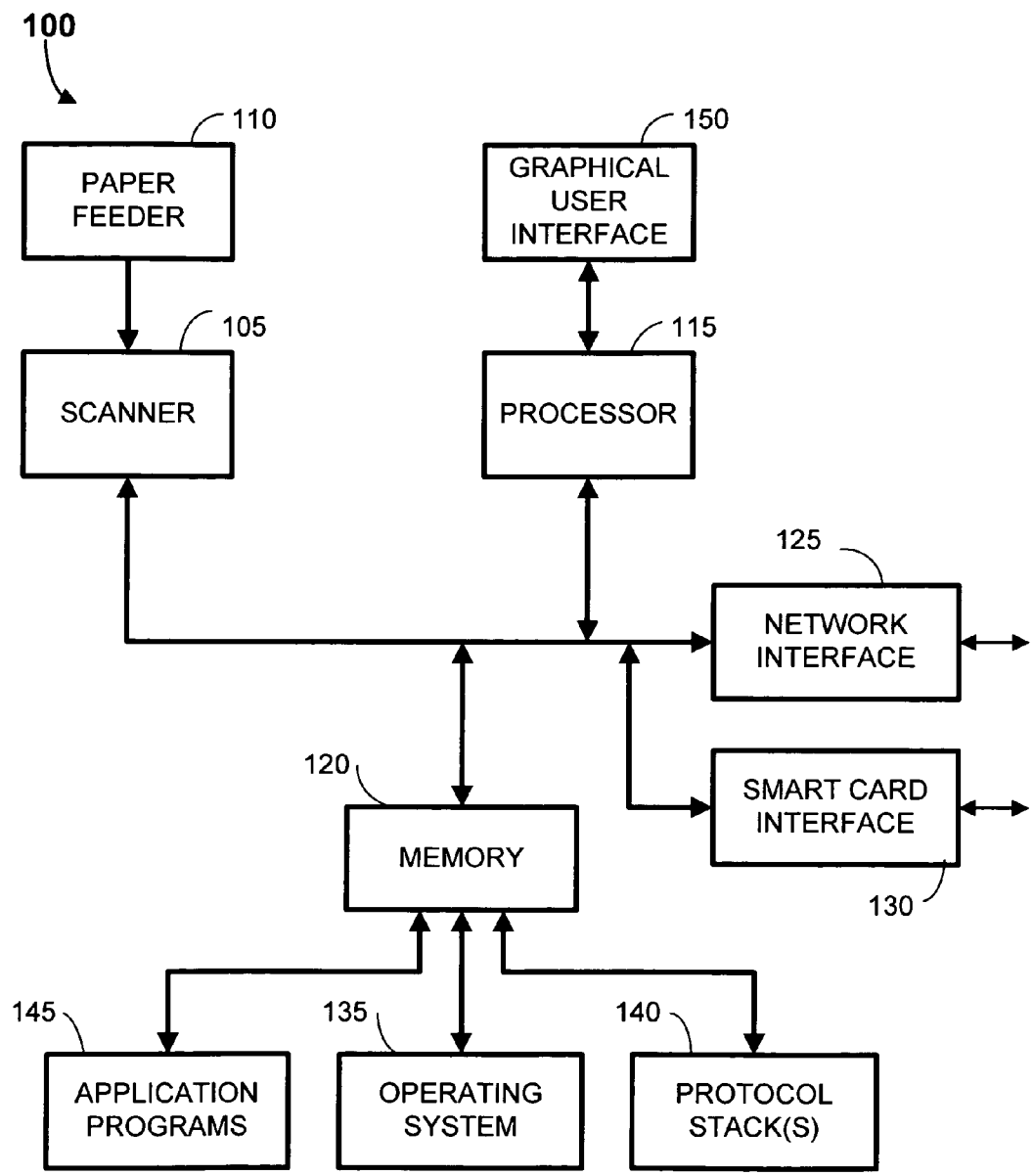
FIG. 1 is a block diagram representing a network scanner constructed in accordance with an exemplary embodiment of the present invention.

FIG. 1 illustrates an exemplary embodiment of the network scanner apparatus 100 ("network scanner") of the present invention. The network scanner 100 includes a scanner engine 105 which is implemented using a scanning surface with any known optical document scanning technology as used in presently available scanners, fax machines, and copy machines. Preferably, a high resolution scanner is used, and most preferably, one that is capable of both black and white and color scanning. In a preferred embodiment, a paper feeder tray 110 (automatic document feeder) is provided and the scanning surface is also accessible to scan book pages and the like that can not be processed through the paper feeder tray. In some embodiments, the scanning surface is thin rectangular like present day fax machines and only paper input via the paper feeder may be scanned. The output of the scanner engine 105 is a digitized scanned bit-mapped image, which is fed to a computerized subsystem. The computerized subsystem includes one or more processors 115 coupled to one or more memory devices (collectively referred to as "the memory" 120). In some embodiments, the scanner engine 105 itself has a dedicated processor to aid in the image digitization process and, in other embodiments, a single processor is used to assist in the digitization operations and to support other software functions.

A network interface 125 and an optional smart card interface 130 are coupled to the computerized subsystem. The network interface 125 may be an Ethernet connector, a WiFi/802.11 wireless network interface, or any other type of network interface (e.g., LAN). In some embodiments, the network interface 125 may provide a WiFi gateway access function as well as, for example, an Ethernet connection for coupling to the Internet. The smart card interface 130 may be a smart card slot reader, or may communicate via similar personal communications or computerized devices like PDAs capable of holding user-specific data. In some embodiments, the smart card interface 130 may be replaced by or augmented with a biometric scanner such as a fingerprint scanner. For further details, reference can be made to the parent application that is incorporated herein by reference. The smart card reader and/or biometric sensor allows a user to provide strong authentication of the user's identity. For example, the user inserts his/her smart card, enters a user name and password or a PIN, and/or provides a biometric indication or input, such as a thumbprint, into a biometric sensor or biometric security device provided in some embodiments. The smart card preferably includes public and private encryption keys and a digital signature for user authentication. With such a system, a user may be positively identified and positively linked to a particular document scanned and transmitted at a specific time. As discussed previously, any discussion herein relating to functionality of a smart card could alternatively be implemented via a wirelessly connected PDA type device or a password protected network storage based user account.

The memory 120 is used to store data and to hold a set of computer programs such as an operating system 135, communication software (protocol stacks) 140 to run the network interface 125 and the smart card interface 130, and upper layer software like TCP/IP software. Also contained in the memory 120 are a set of application programs 145 described hereinafter. In some embodiments the memory 120 may include mass storage for document and file storage and remote access.

The user interface preferably includes a GUI 150 that allows a user to manipulate graphical objects, windows, and menus. Depending on the embodiment, keyboard inputs, pen type inputs and/or voice inputs with speech recognition can be used. GUI interfaces similar to those that run on current day PDAs are envisioned as being preferable. In some multifunction embodiments (primarily for SOHO applications), a printer may be incorporated into the apparatus as well to provide both scanning and printing capabilities from the same housing. In office environments, the present invention may be built into a large multifunction unit also acting as a printer and a high capacity copy machine.

In many preferred embodiments, the network scanner of the present invention looks like a conventional fax machine. In such embodiments, a VoIP telephone may optionally be built in to allow both telephone calls and document calls to be made, thereby providing an integrated scanner/VoIP device that has the look and feel of a conventional fax machine but uses indigenous broadband network access and Internet transport technologies. Since at least some of the same components and/or circuitry can be used for implementing both the scanner and VoIP telephony functionality (e.g., the same processor(s), memory(ies), and possibly, the same call-setup application layer programs and communication protocols), the integrated scanner/VoIP device can be made more compact and at a significantly lower cost, as compared to separate, standalone scanner and VoIP devices. In order to further reduce the footprint of the integrated scanner/VoIP device, the scanning surface may be designed to be small so that only documents loaded into the paper feeder can be scanned. Alternatively, standard WiFi access interface may be provided by the network scanner that allows the network scanner to interface with handheld wireless VoIP enabled telephone handsets (to include cordless type handsets and cellular phones that have the ability to roam onto WiFi networks.

Notably, the same endpoint-to-endpoint connection or communications path ("communications link") that is established when placing a VoIP telephone call may be used to transmit a scanned electronic document to the same party, so that the sending party can be speaking with the receiving party while the document is being transmitted. For example, a TCP/IP control channel can be established by first sending a UDP message to a distant end via the Internet. In some case the UDP (or a different TCP/IP) address may be obtained by a SIP server. A first and second call channel may then be established to carry the outgoing and incoming VoIP media streams, and a third media channel can be established for transmitting the electronic document. This multi-channel connection can be implemented using various technologies to include the H.323 series of VoIP standards used to setup and maintain calls that carry voice, video and other data types.

Preferably, when establishing a multimedia call, the user, e.g., via the GUI 150, can selectively vary the bandwidth allocated to each socket or channel. For example, when document transmission speed is more important than voice quality, the user could increase the bandwidth allocated for the document transmission channel or socket, and, alternatively, if voice quality is more important than document transmission speed, then the user could increase the bandwidth allocated for the VoIP telephony channel or socket. Of course, a document-only call could use a similar setup procedure to transfer the document via an established point-to-point transport pipe (e.g. TCP/IP data channel connection) without the need to establish a VoIP connection. Also, the SIP protocol may be used to determine the initial UDP or TCP/IP address needed to set up the call and/or control channel by looking up an address like eric@aol.com and generating an active IP address (or mobile IP address) therefrom.

The protocol stacks 140 are preferably provided as a portion of the software and/or firmware to allow the network scanner 100 to communicate with external computers, servers, and networks. For example, the network scanner 100 may be connected to an Ethernet LAN, an Ethernet connection to a router, an Ethernet connection to a cable modem, to a WiFi network (e.g., 802.11), Bluetooth, USB, wireless USB, FireWire, or any other protocol. In some particular embodiments, the network scanner 100 may be coupled directly to a single computer, and in other particular embodiments, the network scanner 100 may have its own link layer address on a LAN, and may also have its own Internet (IP) address, for example, an IP address assigned to it by a domain controller (a DNS and/or DHCP controller). In a preferred embodiment, the protocol stack 140 also includes transport and network software layers and is coupled to an application software layer, e.g., to application programs 145.

The application programs 145 include user input-output functions and capabilities accessed via the GUI 150. For example, the application programs 145 allow a user to use a Windows Explorer™ type application to view a file system located on a remote computer connected to the network scanner 100 via any suitable wired or wireless communications network or coupling, for example, via a direct coupling, via a LAN coupling via a TCP/IP connection to the Internet, or via a corporate Intranet. The GUI 150 can also support specialized email client software designed to run directly on the network scanner 100. Additionally, the GUI 150 can support user authentication functions and can support a set of GUIs used to implement the application program methods described hereinbelow. In general, the GUI functions enable a user to control and manage the creation and transmission of electronic documents scanned from source hard copy input. Other types of application programs implement new types of document, security, and communication protocols that allow network based scanners to provide enhanced functionality as described hereinbelow.

In a preferred embodiment, the application programs 145 include software for image and/or document compression. Many known compression algorithms are used to compress documents, images, and other kinds of data files. In a preferred embodiment, the software resident in the network scanner 100 implements a compression algorithm so that the resultant electronic document can be transmitted using fewer bits of data (and thus, using less bandwidth). Preferably, lossless compression is used and any authentication data such as digital signatures are not altered by the compression algorithm, or the authentication and/or encryption algorithm may be applied directly to the compressed document. Also, different resolution levels may be intelligently selected to reduce bandwidth needs. For example, a black and white document would need fewer bits to represent than a scanned color photograph.

It can be recognized that the network scanner 100 of the present invention uses fairly standard computerized hardware. Scanners are well known in the art, as is network interface hardware, smart card hardware, operating systems, and GUI interfaces. However, the present invention, among other things, encompasses a novel combination and configuration of such conventional hardware elements, as well as novel software, to implement the novel configurations and methodologies employed by the network scanner of the present invention. One of ordinary skill in the art (e.g., a computer programmer) can easily implement the described program functionality given the hardware architecture described above and the software and system level operational functionality described below, in numerous ways that would each fall within the spirit and scope of the present invention.

Figure 2:
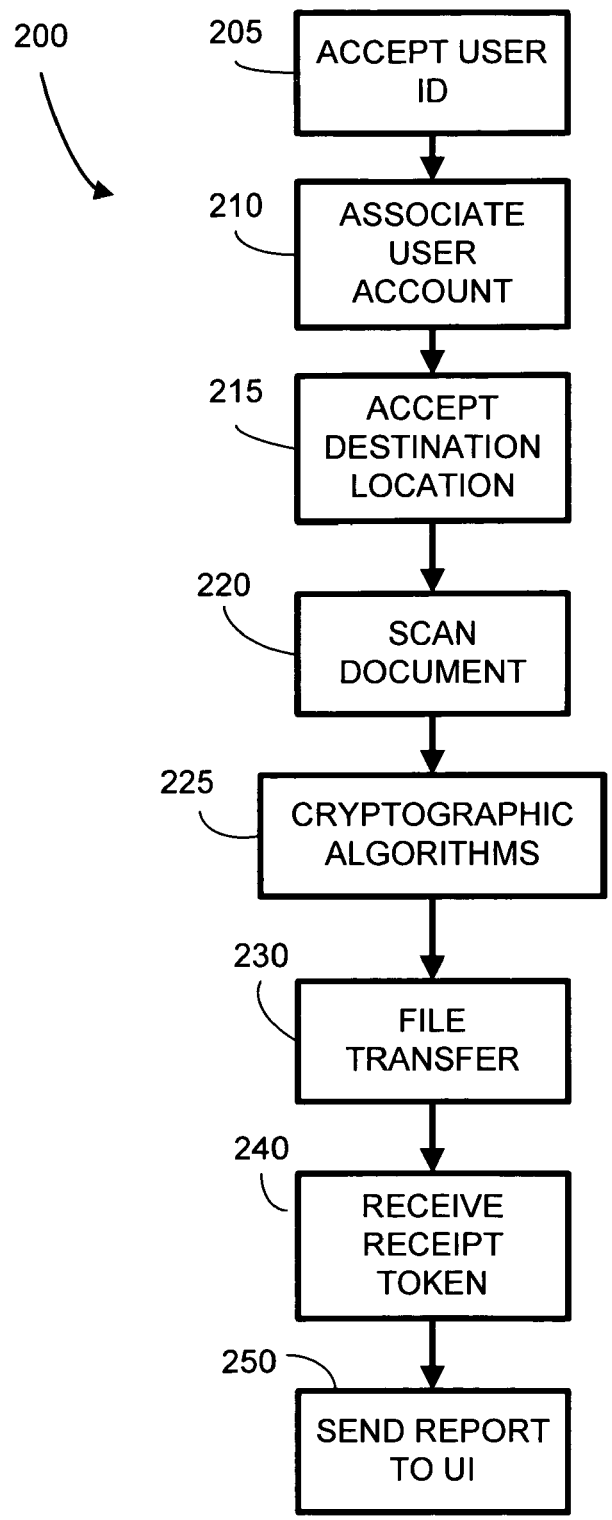
FIG. 2 is a flow chart illustrating a method that allows a network scanner to provide an enhanced form of document communication that is similar in ways to facsimile communications, but much more secure and convenient.

Referring now to FIG. 2, a method 200 constituting an exemplary embodiment of an aspect of the present invention is illustrated in flow chart form, and particularly depicts a preferred embodiment of how the application software 145, the GUI 150 and the protocol stacks 140 interact with the rest of the hardware to implement aspects of the scan-to-folder document communication protocols of the present invention. As is described below, many of the aspects of the invention may also be used to provide enhanced scan-to-email technologies as well. It should be noted that in the method 200, the functional blocks can be rearranged in various configurations. All orderings and configurations of the functional blocks in practicing the method 200 that result in operative embodiments are contemplated, but for simplicity and ease of discussion, only one representative ordering-embodiment of the method is described.

The method 200 is typically implemented using a network scanner such as the network scanner 100. To understand the method 200, envision an embodiment where the network scanner 100 looks just like a current day fax machine, except that the user interface 150 looks more like a modern day PDA GUI that supports keyboard entry, mouse and/or pen entry, and a display surface that can provide a Windows™-type set of windows, menus, icons, dialog boxes and the like.

In accordance with the method 200, a user ID is accepted from a user at a step 205. As discussed in the examples below, this step can be accomplished by the user inserting a smart card in a smart card reader integrated into the network scanner 100 (or coupled thereto) and entering a PIN, entering a user name and password into a dialog box, pressing a thumb onto a fingerprint sensor, and/or any other input means. Once the user has been identified, at step 210, the network scanner 100 associates the user with a document to be scanned and/or a user account. The association of the user with the user account allows scanned documents to be placed in preferably secure storage areas associated with the positively identified user. Also, once the user is identified, a set of user preferences may be accessed from the local scanner memory 120, downloaded from a networked computer or file server that holds user preference and customization/personalization data, or can be read from a smart card or wireless PDA type device carried by the user. For example, a customized GUI may be presented and the user may be granted access to a set of remote network resources and accounts such as email accounts and/or other types of document transmission accounts where address books and such are kept to facilitate electronic document transfer to various possible recipients.

The network scanner 100 may also connect to an external computer or server to access a storage area associated with a user account in order to write the scanned document to a particular location associated with the particular user who is using the network scanner. Similarly, the memory 120 may include sufficient mass storage that the network scanner 100 may associate the user with a designated area in local storage 120. This way the network scanner 100 can write a scanned document into a local storage area associated with the user, and the user can later retrieve the scanned file remotely using client software running on his/her PC or workstation located across a network connection.

In an optional step 215, a user identifies one or more destination locations to place the scanned document. The destination location may be identified as a file folder on the user's computer using a network wide file folder user interface to allow the user to specify to place the document in a particular folder within his/her own file directory structure. Alternatively, or in addition, the user may want to send the scanned document to one or more inboxes ("shared folders" adapted to accept external transmissions from other parties) associated with one or more recipients. If the optional step 215 is not performed, the scanned file can be stored locally within the memory 120 in an area where it can be retrieved remotely by the user, once authenticated across the network. Likewise, the file may automatically be scanned to a pre-designated scan-input directory associated with the user but located on the user's computer or a file server where the user's files are stored. In this type of embodiment, the user may need to go back to his/her computer to complete the other steps of the method.

Next, in step 220, the document is scanned. A set of one or more cryptographic algorithms may be optionally applied to the document to positively identify it with the user who scanned the document or who will send the document. As discussed below, digital signature keys stored on a user's smart card may be applied to verify the identity of the user via digital signature. This way, if a user scans a signed document or a note asking for a change or the like, the user's digital signature may be used to ensure the recipient that the signed document was not altered or otherwise forged. This optional step provides much higher security than is provided by present day fax technology.

In step 230, a file transfer is performed using a communication protocol. Preferably, the user is presented (via the GUI 150) a menu giving the user a choice of different communication protocol options. Scan-to-email is one option, but the scan-to-folder protocols described in more detail below may also be used, with the latter protocols being presently contemplated as the preferred protocols. For example, the file may be scanned and placed into a file folder located in the user's file directory structure on a remote computer or file server, or may be transported across the Internet to a shared folder area on any third party computer located anywhere in the world. As discussed below, various technologies such as FTP, SIP, and remote control/remote access computer software (e.g., GoToMyPC™ like software) may be used to gain access to a writeable area in a directory structure on a remote computer associated with the recipient (which could be the sender's own computer or a computer associated with a third party). The writeable area could be "public" or "private". Access to a private storage area could be controlled using filters, user authentication controls, access controls, and any other suitable private file access scheme or protocol. Access to a public storage area could be controlled using lighter filters and access controls, could be subscription-based and/or could be controlled, if at all, using any other suitable public file access scheme or spam filtering-like protocol.

As discussed in connection with examples below, the transmission step 230 may be carried out via a secure channel like a VPN connection (virtual private network), an SSL (secure sockets layer) session, and/or additional security functions may be applied to the document itself by one or more of the application programs 145. Hence a full range of authentication, encryption, and access controls may be applied seamlessly to provide much higher level security and a more user friendly user interface than is provided by legacy fax technology.

In an optional step 240, a peer protocol entity in the computer associated with the recipient analyzes the received document and sends back a confirmation of receipt token. For example, the document may be analyzed at the recipient computer and the recipient computer may send back a reply message (preferably digitally signed by the recipient computer) stating that, for example, a document of 21 pages was successfully received. In a preferred embodiment, a cryptographic hash function is applied at the recipient computer to provide verifiable proof that the document was received intact and unaltered. Transmission integrity algorithms are well known in the art and are often implemented using public-private key algorithms. Transmission integrity algorithms enable independent verification that the received document is identical to the transmitted document. It will be appreciated that public-private key encryption algorithms have the salutary effect of authenticating both the sender and recipient of the document, since only the sender and intended recipient would have possession of the proper private key required to encrypt and decrypt the document, respectively.

Alternatively, or in addition to such document encryption/decryption schemes, in accordance with another novel aspect of the present invention, the intended recipient could be prompted to authenticate himself/herself before being allowed access to the transmitted document (e.g., before being allowed to receive or open the transmitted document). For example, such recipient authentication could be accomplished by means of the intended recipient inserting a smart card into a smart card reader coupled to or built into the intended recipient's computer (or network scanner), and then transmitting the user ID/authentication information from the smart card to a remote server and/or to the transmitting party to facilitate verification that the receiving party is indeed the intended recipient. Alternatively, the intended recipient could be required to apply his/her thumbprint to a biometric sensor coupled to or built into the intended recipient's computer (or network scanner) in order to positively identify the intended recipient. The thumbprint information could then be transmitted, preferably over a secure network or transport pipe, such as a VPN transport pipe (to avoid identity theft), to a remote server and/or to the transmitting party to facilitate verification that the receiving party is indeed the intended recipient. Alternatively, application software could be provided to be installed on the recipient's computer to perform this recipient authentication function. This type of recipient access control adds a further layer of security to the document management system of the present invention.

In a final step 250, a report or token is sent from the recipient computer back to the network scanner. The report or token can be logged in an appropriate reception log file in the recipient computer file directory. At the network scanner 100, the report can be displayed to the user via the GUI 150 and/or can be logged into a transmission log file to tag a transmitted document as having been verified as received by the recipient or the recipient's computer. Such reports or tokens could also be stored in an outbound log or electronic outbound file cabinet so a user could have a record of all documents sent along with confirmation of receipt. This way, much like fax technology, the sender has confirmation that the document was received, and the recipient has confirmation the document came from where it was sent unaltered. However, the present invention can transmit laser quality documents anywhere in the world without the need to use costly telephone lines. In addition to superior image quality and significant cost savings, document transmission security and document integrity is much improved over the presently available technology. Whereas faxed signatures can be easily forged and manipulated, the digital signature embedded into the scanned document cannot.

In an alternative embodiment, an additional report can be sent back when the specified recipient user actually opens the document. For example, a peer application layer protocol entity at the distant end can send back a user specific receipt token once the actual recipient opens the document. In this manner, the sender not only can have confirmation that the document was received, but that it was received and opened by the specific recipient. In applications like electronic filing at the USPTO, where a sender may wish to know when the documents he/she sent were processed, but may not care by whom, the protocol entity at the distant end can send back a message verifying the document was opened, but not necessarily verify the specific person who opened it. However, if the USPTO, for example, wanted to hold individuals accountable for mistakes or otherwise wanted to know the person who handled a particular document, the token might identify the particular person who received the document. Additionally, a digital signature can be applied to the report or token sent from the recipient computer back to the network scanner to further ensure that the party who actually received the document was the intended recipient.

It should be appreciated that a cryptographic hash function and/or other document receipt verification function can also be used in conjunction with presently available scan-to-email systems in order to enhance the utility and acceptance thereof. For example, users of presently available scan-to-email systems typically choose to scan hard copy documents into bitmap format (.bmp) electronic documents because bitmap documents are not readily computer manipulable and are therefore regarded as more "secure". As discussed previously, the use of a bitmap image file format increases the document transmission bandwidth requirements and/or the document transmission time, which significantly detracts from the utility and acceptance of the scan-to-email system. However, once a digital signature or other form of robust document integrity/security (e.g., a biometric sensor input) is applied prior to transmission of the electronic document in accordance with the methodology of the present invention, then the particular image file format used does not affect the security/integrity of the transmitted document, because if someone later attempts to edit, alter, or otherwise electronically manipulate the received document at the recipient computer, the cryptographic hash will be destroyed, and thus, it can be determined that the integrity of the document has been compromised. Also, edit-resistant and edit-proof document formats may be used that do not allow the document to be modified. Thus, a compressed image file format can be used in lieu of a bitmap image file format for creating and transmitting the scanned documents, thereby decreasing the required document transmission bandwidth and/or document transmission time, while at the same time actually enhancing the document integrity/security afforded by the scan-to-email system, thereby significantly enhancing the utility and acceptance of the scan-to-email system. Similarly, in accordance with an aspect of the present invention, a return receipt email message may preferably be automatically sent back to the sender when the recipient email server receives the document and/or when the recipient downloads and/or opens the attached document.

To illustrate the operation of a preferred embodiment of the present invention by way of example, consider a situation where a network scanner in accordance with the present invention is located in a corporate environment that has a plurality of PCs and/or workstations and possibly file servers and peripherals like networked printers attached to a switched LAN. Moreover, assume the LAN is connected to a router so that all of the computers in the corporate environment are connected via a corporate intranet. Now suppose a first user, "user A", walks down the hall to an area where the network scanner is located. User A interacts with the network scanner via the GUI and/or a smart card interface. For example, when the user enters either his/her username and password or inserts his smart card and enters a PIN into the network scanner, the GUI recognizes the user and shows a directory structure that corresponds to user A's directory structure as maintained on a corporate file server. User A then uses the Window's Explorer™ type GUI to navigate to a particular folder where he/she would like to store the document in his/her directory structure. Next he/she presses a button or clicks a mouse, and runs the document through the feeder, so it can be scanned, digitized and stored as an image file. Next, the image file is routed to the networked file server and stored in the selected sub-directory (folder) in user A's account. Similarly, a user B can walk down the hall from a different office, interact with the GUI, scan a document, and store the document in a subdirectory of user B's account selected by user B.

Much like a network based printer can be attached to a local area network and accept print jobs from multiple users, the network scanner of the present invention can be attached to a local area network and can be used to scan in a document, generate an image file and send the image file to be stored in a computer file folder (file system directory) associated with a particular user's computer account. As discussed below, this is but one use. Another is global document communications between different users located in diverse geographical locations.

It can be readily appreciated that with this configuration, the networked scanner can be shared by many users similar to a networked printer. While the networked printer needs no GUI because the users send files to the printer from their desktops (i.e., the GUI for managing printer operations is located at the desktop), the networked scanner does need a user interface because the direction of travel is from the peripheral back to the individual user's computer file systems (computer accounts). In some SOHO applications, the networked scanner can be made simpler and the client software can actually run on the single computer to which it is attached. However, a networked scanner with a GUI can also be useful in a single-computer SOHO environment as well, as will become apparent from the discussion below. Also, in certain embodiments, a smart card reader is desirable, and this may or may not be available on the PC. Hence, in all embodiments, the GUI discussed herein is desirable, although at least certain functions may be controlled from an attached or networked PC, as discussed below.

Next, consider a global communications application more akin to a fax function than the shared scanner function described above. In such an application, user A wishes to send a document to user B. There are several ways this can be done, but first consider an email embodiment. In this scenario, user A walks up to the networked scanner, enters his/her user name and password or inserts his/her smart card (user authentication is an optional feature that can be implemented with or without smart cards), and launches a communications application such as a scan-to-email client or a scan-to-folder client.

In the case where a scan-to-email client is used, the client application now connects to a remote email server just like a normal email client that runs on a PC. For example, the email server used by user A may be Hotmail.com™. The user then accesses his/her address book or types in the user B's email address. Now, user A inserts the document into the paper feeder, the pages are scanned, an image file is created, and the image file is then sent via email as an attachment to user B's email account. In some embodiments, user A can type an email message to be sent along with the attachment in the body of the email message. Otherwise, a standard HTML page may be sent, or any other fixed or user-selected message may be sent along with the attachment. In general, any upload technology may be equivalently used whereby the user A uploads the document to a server and the recipient (user B) later downloads the document from the server to his/her local computer or file server.

In the case where a scan-to-folder client is used, the client application may alternatively connect directly to a recipient's computer, file server, or Internet Appliance via a transport session using for example, a VPN, an SSL session, or a SIP session, and/or H.323-like set of channels, possibly in combination with a remote PC/LAN access application like the modified version of GoToMyPC™ described below. Now, user A inserts the document into the paper feeder, the pages are scanned, an image file is created, and the image file is then sent via a direct session pipe or direct session link to a computer resource or storage file associated with user B. In some embodiments, the user can type in a message to augment the directly transmitted document, basically attaching a text message to the file to be transferred, a reverse of the concept of an email attachment, but similar. In general, any transport technology may be equivalently used whereby the user A causes a packet transport pipe to be coupled directly to a computerized resource controlled by the recipient (e.g., user B). As discussed in connection with the method 200, user B and/or user B's computer system preferably sends a confirmation of receipt back to user A.

In the context discussed above, the document call looks much like a SIP call or an H.323 call whereby at least one media type used in the call corresponds to a data media type. In this application, the data media type corresponds to a file such as an image file, preferably one that has been compressed and to which user authentication information such as a digital signature has been embedded. As such, native Internet type protocols are used to provide an enhanced fax-like service that never need to traverse the telephone network nor be converted to analog fax signals like G3 fax signals. Notably, the above-described network scanner allows high quality image files to be sent anywhere in the world via email (scan-to-email) or via direct transport pipes (scan-to-folder). Never is the document converted to a fax and sent over the telephone lines. Never is image quality reduced by converting the document to a G3 fax protocol, nor are any telephone toll charges incurred. No fax boards are needed at a fax-to-email server. In this type of embodiment, all that is needed is a standard email account and an email client that is accessible via the GUI provided by the networked scanner apparatus.

As previously discussed, scan-to-folder technology can be used in a corporate network environment, and/or FTP or any other file transfer or communications protocols may be used to send scanned documents directly from the network scanner to a directory in a file system controlled by a target recipient. Just like email clients, inventive messaging clients with message mailbox style GUIs can be used to allow users to look at inboxes associated with incoming file transfers and outboxes of transmitted files. In accordance with the scan-to-folder aspect of the present invention, a messaging mailbox interface is provided, and documents can be pushed directly to a recipient's computer or to a file server. When a user receives a pushed document, the user sees a mailbox style interface and can access and manage the messages that have been pushed into his/her inbox. The above-described strong user authentication, document transmission integrity, and confirmation of receipt features of the system of the preferred embodiment of the present invention make this system much more secure than presently available fax technology or presently available scan-to-email technology, e.g., for executing legal documents. The novel transport mechanisms of the present invention, especially scan-to-folder, are cheaper to use than telephone fax transmissions (to include email-to-fax) and do not require the recipient to wait for long file downloads and to hang up an email client while a file uploads at the sending side.

In alternate embodiments, some of the features described herein can be implemented on the network scanner and other features implemented on a networked PC. For example, if the GUI and/or smart card interface is provided, a particular user can enter his/her user name and password or strong authentication data and a PIN, and this could allow the scanner to be associated with a particular user. In this type of embodiment, the document is scanned, and is placed into a selected directory belonging to the particular user, and the particular user can then launch a specialized client such as a scanner-to-email and/or scanner-to-folder application program from his/her PC.

The present invention allows a user of the network scanner to identify himself/herself, and to have the network scanner then possibly accept further commands from the user, and route the document to a particular location in internal scanner memory (e.g., implemented as disk or RAM storage) or to any file server on a local or remote network (such as a file in a networked directory structure). With this capability, other inventive protocols and functions disclosed herein may be implemented in a remote PC. So long as the network scanner associates the scanned document with a user account, the user can perform further processing on the scanned document from a remote location.

To enable such mixed or hybrid embodiments in which some of the client software resides on a networked PC and other client software resides on the network scanner, the required functions are distributed amongst the software components accordingly. The network scanner preferably has at least a user interface to identify a user who is inputting a document for scanning. In a preferred embodiment, the user enters a user name and password, a smart card and a PIN, or an equivalent thereof or alternative thereto, such as a wireless PDA and a PIN. Once the network scanner knows the identity of the user, a scanned document can be associated with that user, and any function executed from that time forward can be performed using a client that resides either on the network scanner or the networked PC. For example, after scanning a document, the scanner can store it and associate it with the user, and the user can go back to his/her PC to access the scanned document across the network and move it into his/her file directory and/or send it to a remote location using any of the methods described herein.

In some embodiments, the user can, once back at his/her PC, insert a smart card into his/her PC, and/or apply an input to a biometric sensor and implement any of the security algorithms discussed herein. Likewise, the scan-to-folder software could run on the user's PC in some alternative embodiments. The scan-to-folder clients are preferably available both from the network scanner GUI 150 and also at the PC or workstation operated by the user. Typically, a user will maintain his/her inboxes and outboxes from his/her PC. Thus, having versions of the scan-to-email and the scan-to-folder clients located both on the client PC and the network scanner 100 is preferred. However, as long as the user can identify himself/herself to the network scanner so the network scanner can associate the scanned document with one of a plurality of possible users who share the networked scanner, the other software components of the invention may be located on the network scanner and/or on a computer resource coupled to the network scanner via a LAN, VPN, or other network connection. Similarly, the file transmission and handshake protocols discussed herein may also be implemented using a networked computer resource.

To improve security over the light form of security provided by current fax technology and to improve the way business and legal transactions are performed, another aspect of the invention involves improved sender-authentication security. In a variation of the method 200, a user walks up to the network scanner with a signed contract in hand. The user then enters his/her smart card into the network scanner in step 205. A smart card reader in the network scanner communicates with the smart card and asks for the user to enter a PIN, much like an ATM card. The network scanner then accepts the user's PIN, also in step 205, and if correct, grants secure access to the user in addition to performing the step 210. As discussed previously, user preferences may be loaded from local storage of the network scanner based on a user account, from a network server resident user account database, or from the smart card inserted into the network scanner to provide a customized GUI. Once the user has been identified, the user causes a scan-to-email or scan-to-folder client to be launched (or it is launched and logged into automatically based on a user preference setting), and/or a direct file transfer unified messaging client is launched similar to the one discussed in FIGS. 3-4.

Using the appropriate client, the user then selects a recipient from his/her address book or enters the email address manually. In this example, the user then selects strong authentication and also selects strong encryption. In one embodiment, application software 145 preferably resident in the network scanner then causes a digital signature and a public key to be read from the inserted smart card by the smart card reader to be applied to a scanned image file (generated in step 220). Alternatively, the scanned image file is sent to the smart card and an encryption/authentication application on the smart card applies an appropriate set of cipher algorithms (step 225) to be applied to the document. In this manner, the smart card does not need to reveal the user's private key to the network scanner which is in general less secure (susceptible to software hacking) than the smart card itself. The basic idea of streaming a document through a smart card so that a digital signature may be embedded therein may also be executed on a PC with a smart card reader and applied to any file type prior to transmission of the file to another user via email or a document call type as described herein.

Hence, in a preferred embodiment, the scanned image file is streamed to the smart card which applies the cipher(s) to authenticate and/or encrypt the image file. The image file is then streamed back to the network scanner. Once the image file is received, it can be sent via an email server, a remote control access server, or via any type of direct point-to-point file transfer protocol (including document calls as described herein) to any other local or remote computer, file server, or networked printer as discussed below. With this type of system, the received image document may be positively identified as being sent by the same person who signed the document. Simple fax type forgeries are not possible. The user who signed the document must be physically located at the network scanner in order to send the digitally signed document. In an aspect of the invention, a bar code or digital watermark is preferably added by the smart card to be printed, e.g., in a header and/or a footer on each page of the received document.

Also, in the electronic version of the document, a digital signature is preferably applied to the data so the entire contents of the document can be digitally authenticated. This way, each page of the document is positively signed by the signatory, and there is no way pages can be changed out. For example, with current fax technology and even standard copier technology, a fifty page contract is typically signed only on the last page. It is cumbersome for each party to initial each and every page, so this is not typically done. But when a signatory enters his/her smart card and authentication data in the network scanner, it is trivial to add a digital signature watermark to each and every page and to authenticate each and every bit of the electronic document with a digital signature. It will be appreciated that many other types of document authentication, encryption, and security schemes can be utilized without departing from the spirit and scope of the present invention. Preferably, whatever scheme is selected ensures that each page of the scanned document can be verified by the recipient to have been created (scanned) and/or transmitted by the person who is identified to the recipient as having done so (e.g., the signatory to the document).

Another embodiment of the network scanner 100 and the method 200 are provided for use in public places or to allow a first user to borrow and customize/personalize a device owned by a third party. Reference can be made to the disclosure of the parent application incorporated herein by reference for background and further options of the embodiment discussed in this and the next paragraph. For example, a user is in an airport or at a hotel and has recently executed a contract while visiting a client. The user walks up to a public network scanner device and inserts his/her smart card. In any of the embodiments described herein, a user's PDA or other wireless device that contains the same type of information that is on the smart card but uses a wireless interface instead of a physical smart card interface may take the place of the smart card. For ease of description, suppose the user is using a smart card and inserts the smart card into the network scanner. After any additional user authentication such as a user PIN is provided, the network scanner presents a GUI screen that indicates the user has access to the public network scanner. An application on the smart card (or wireless device) then interacts with the scanner and provides either credit card information, debit card information, or a form of digital cash. Then an application on the smart card provides user settings and preferences information to the public network scanner.

After having received the smart card in the public network scanner, the public network scanner can take on a personality of the user. That is, user customized data relating to a user's email account, scan-to-folder account, address books, and other information may be seamlessly accessed without the user needing to log into multiple servers. Now the user can place his/her document into the feeder tray and use the GUI-supplied address book to send the document, with or without a digital signature, to an intended recipient, using either an email server, an FTP server, or by means of a direct session transfer, to a recipient's computer (destination).

In the parent application, an alternative embodiment is disclosed wherein the user preferences and settings are supplied by a remote network server. The user enters a username and password, and the remote network server then supplies the same services as the smart card. This allows systems to be implemented in which the user need not carry a smart card, but can nevertheless receive similar benefits and services. These types of embodiments may also be used with the network scanner of the present invention. In embodiments of the present invention in which the method 200 is practiced in public environments, a final step is preferably added to the method 200 whereby the smart card is charged via a user subscriber account, credit account, a debit account, or via digital cash certificates to pay for the use of the publicly available scanner.

In an aspect of the present invention, the scan-to-folder client is similar to an email client or a unified messaging client. In the unified messaging embodiment, the scan-to-folder inboxes and outboxes can be integrated with an email client. That is, a single unified messaging client can be used to view incoming and outgoing emails as well as incoming and outgoing scan-to-file documents.

Figure 3:
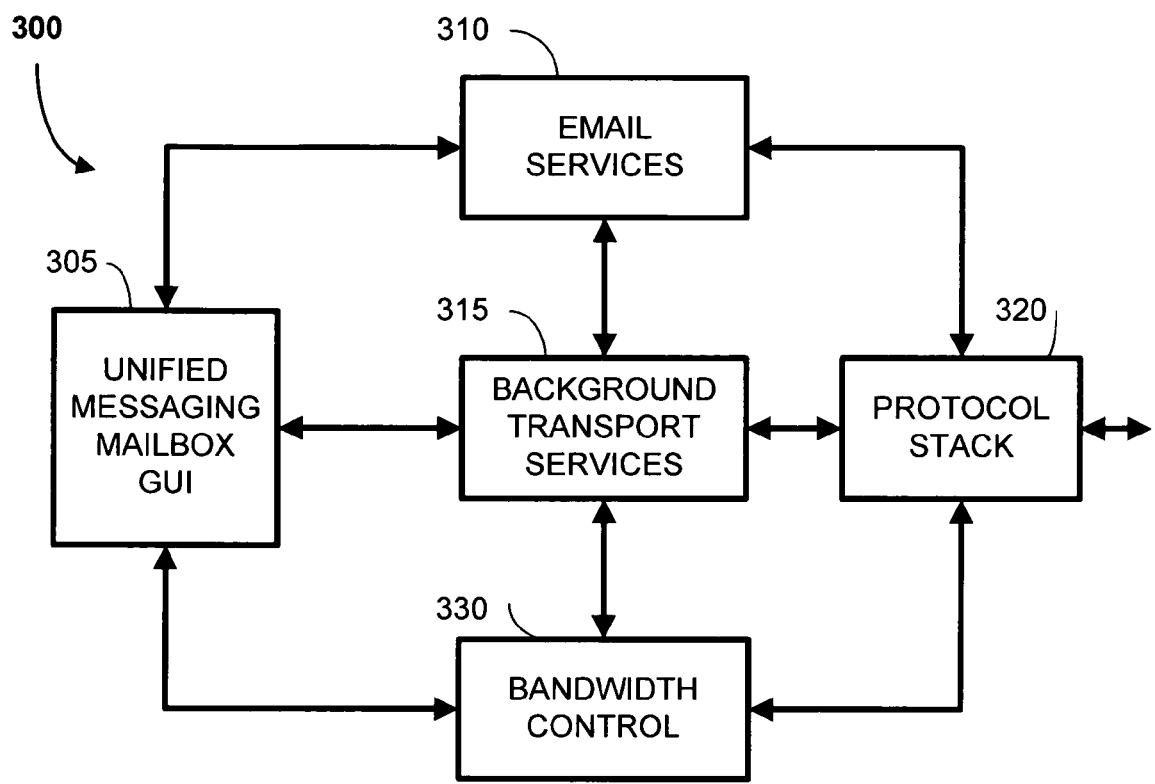
FIG. 3 is a block diagram representing the architecture of inventive unified client software that allows users to manage both emails and scan-to-folder data messages.

Referring now to FIG. 3, a unified messaging client application 300 is illustrated in block diagram form. The application 300 includes a unified messaging mailbox GUI 305 that can be used to manage one or more message types such as email messages (possibly having attachments) and scan-to-folder type messages used for direct point-to-point document transfer. It is noted that the unified messaging client of the present invention may only support, for example, document calls, but also may preferably support email, document mail server access, VoIP and video messaging data types in different embodiments.

In an exemplary embodiment of such a client, an email services component 310 and a background transport services component 315 are both accessible via the unified messaging mailbox GUI 305. The email services component 310 is coupled via a protocol stack 320 to an email server and implements client-side email functions as are known in the art. The background transport services component 315 is also coupled to the protocol stack 320 and manages remote file transfers in a point-to-point fashion with remote computers to send and receive files using a protocol like FTP, SIP, and/or via a remote control server application such as a GoTo-MyPC™ server-side program that has been modified in accordance with the present invention as discussed above to communicate with computer systems belonging to other users or entities.

In a preferred embodiment, the background transport services component 315 includes a background process forking mechanism. That is, when a user wishes to send a document, a process is forked in the background. This way, a user's mailbox is freed up so the user can access email and perform other messaging tasks instead of having to wait for a file to upload or download. Preferably, the GUI allows the user to control the amount of bandwidth that the background transport services can use. Preferably, the bandwidth control can also be applied to email uploads and downloads and a preferred embodiment of the client allows background tasks to be forked for email uploads and downloads as well. The optional bandwidth control component 330 is desirable because it allows documents to be uploaded, downloaded, and to be sent to and received from remote computers without tying up all the bandwidth resources and causing a user to have to sit and wait while a file uploads, downloads, or is transmitted or received from a remote computer.

Also, it is noted by the present inventors that often VoIP quality is seriously impaired as a file is being downloaded from a shared connection. In order to enable a user to exercise some control over the quality of a VoIP telephone call while uploading or downloading files or otherwise communicating over a shared connection, in accordance with an alternative embodiment of the present invention, the user, via the bandwidth control component 330 (e.g., accessed via the GUI 150), can selectively vary the bandwidth allocated to one or more types of communication. For example, when document transmission speed and/or document quality (e.g., image resolution) is more important to the user than is voice quality, the user could increase the bandwidth allocated for the document transmission communication, and, conversely, if voice quality is more important to the user than is document transmission speed and/or document quality, then the user could increase the bandwidth allocated for the VoIP telephony communication.

Further, the bandwidth control component 330 may be implemented as a hardware or software component in a VoIP device. When the VoIP device recognizes that a broadband connection is being used for large file transfers and there is bandwidth contention, the VoIP device preferably causes the bandwidth control component 330 implemented therein, or communicates with the bandwidth control component 330, to cause the upload, the download, or the point-to-point file transfer through the transport pipe 315 to be throttled back to maintain a specified voice quality. While giving voice packets priority over data and/or video packets is known in the art of network routers, no presently available technology enables a user (e.g., in a SOHO environment) to control the bandwidth of file transfers to maintain a desired VoIP quality. Currently, the VoIP quality becomes unintelligible during a file transfer, and the user is not provided with any mechanism to prevent this from happening and/or to regulate the amount of bandwidth allocated to the VoIP call. As mentioned earlier, the VoIP functionality may be built into the network scanner, or the network scanner can act as a WiFi gateway or cordless base station for a cordless handset or a wireless VoIP phone. In such cases, and in embodiments where external VoIP access is provided in the same local area network, bandwidth controls of the present invention may be applied to optimize the sharing of the broadband connection used to carry the various media types (file upload/download, VoIP calls, and document calls and media types).

In accordance with an aspect of the present invention, a user can use the unified messaging GUI to indicate whether the file transfer should throttle back to maintain voice quality or whether it should have precedence. For example, if the user is talking over the VoIP phone, and the person on the other end sends a file that is to be discussed, it might make better sense to wait and allow the file to come in, and then discuss it. In other cases, the user may want to talk and perform certain functions at the same time, like download a file from a different user. In such cases, the VoIP quality would be given precedence. In the present invention, it is also preferable to allow the user to either set a fixed bandwidth allocation preference or to have the ability to throttle back scan-to-folder type messages coming in the background and give preference to other channels such a VoIP connection and/or a file download connection.

Figure 4:
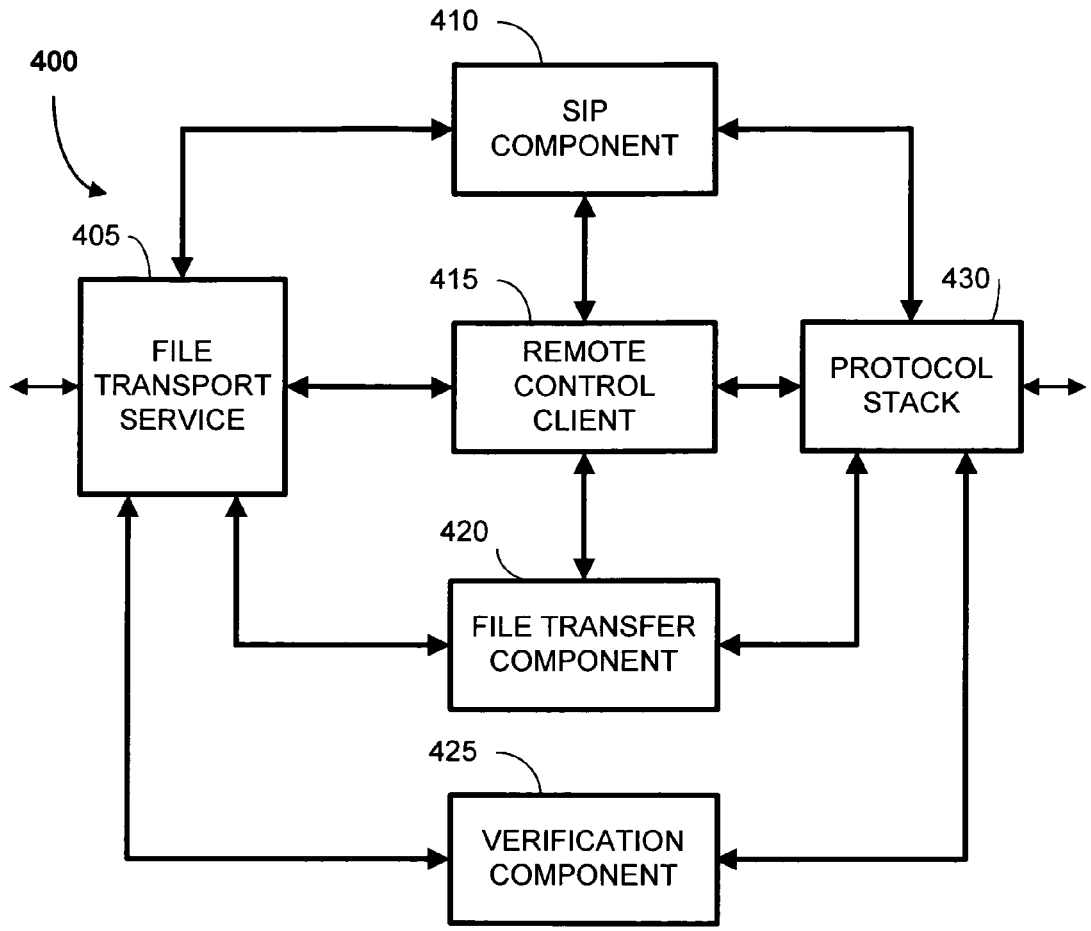
FIG. 4 is a block diagram illustrating a transport service preferably used and controlled by the inventive unified client software illustrated in FIG. 3.

Referring now to FIG. 4, an embodiment of transport services component 400 is discussed. The transport services component 400 may be used as a background process and forked by the background transport services component 315. In a preferred embodiment, the transport services component 400 is accessible and controllable via the unified message mailbox GUI 305 and the bandwidth controls discussed above may be set by the user to manage local broadband bandwidth so the transport services component 400 can operate alongside email upload/download applications and VoIP services. Similarly, the transport bandwidth (input and/or output) of the transport services component 400 may preferably be throttled automatically by a desktop gateway configured to maintain a quality of service (QoS), e.g., in accordance with adjustable user preferences/settings.

The transport services component 400 includes a file transport service component 405 that manages file transfers and network connections. An optional SIP component can be coupled to the transport service component 405. The SIP component may implement the SIP (session initiation protocol) or any other protocol used to set up sessions between remote computers (e.g., SSL, VPN, etc.). In some embodiments, the SIP component communicates with a network side SIP server or a mobile IP server, for example. The network side SIP server or mobile IP server can convert a standard application layer address to a network address like an Internet address where a user or service identified by an address such as a SIP address or a mobile IP address can be located on a network like the Internet. As discussed previously, a connection server, possibly with SIP capabilities or H.323 call setup capabilities may be used to set up calls using a document or file transfer media type.

Also coupled to the transport service component 405 is an optional remote control client (RCC) component 415. The RCC component 415 may be used to gain access to a remote computer, much like a telnet service or a GoToMyPC™ service. The RCC component 415 often communicates with a server side entity that allows a remote computer system or LAN to be accessed remotely. In some cases, VPN (virtual private network technology) is used to provide the access. The RCC client 415 is used to allow the host computer or scanner on which the transport services component 400 resides to communicate directly with a file system or other computer resources located at a remote location such as a corporate LAN, a corporate intranet, or an internal home network or "always on" PC, coupled to the Internet via a broadband connection like a cable modem or DSL connection. The RCC component may be used to cause documents, files and folders to be moved to another user's computer or to remotely access documents transferred to a machine controlled by the user himself/herself.

A file transfer component 420 is used to implement a file transfer protocol such as FTP or any other network file transfer protocol. It is the job of the SIP server and/or the RCC component 415 to locate and gain access to a remote storage system located on a remote target computer belonging to a recipient of a scan-to-folder or other type of file transfer. The file transfer component performs a file transfer to push the file directly to the remote computer file system. A peer protocol entity resident in the recipient's computerized device generally is used to interact with the file transfer component 420. Preferably, the file transfer component 420 is responsive to a user-controlled bandwidth regulation input so that the file transfer can operate in the background while other services like email upload/download and/or VoIP telephony occur in the foreground. Alternatively, the file transfer component 420 could be given a high priority and allowed to consume a larger amount of bandwidth when a fast document transfer is desired.

Also connected to the file transport service 420 is an optional verification component 425. The verification component is operative to receive verifications from remote computers verifying that the transferred file has been received by the computer system and/or opened by the specific recipient. The verification component 425 also is operative to provide verifications when files are received from remote computers. In this type of embodiment, the file transfer component is used to receive a document, and once the document is received, the verification component 425 either performs a file verification operation, a page count verification, a checksum verification, and/or a cryptographic hash function verification. The result of the verification is sent back to the sender. Similarly, the verification component can send a message when the file is opened by the recipient user. That is, the system 400 includes both transmission and reception side protocol entities and can be used to both transmit and receive document calls as discussed herein. Similarly, the optional remote control portion can be used to allow a user to store documents in other user's computers and/or can be used to remotely access documents pushed by other users into the user's computer.

All of the components 410, 415, 420, and 425 communicate with a protocol stack 430 in order to communicate via a network such as a LAN, intranet, or the Internet with external computers and computer resources like file servers. Various types of embodiments are envisioned, and any sub-combination of the components 410, 415, 420, and 425 may be included in a particular embodiment.

The transport services component 400 may be used to both transmit and receive documents. It should be noted that the transport services component 400 may be used to transmit and receive other types of information like entire CD-ROMs that carry multimedia information, or which carry directory structures. For example, the file transfer mechanisms of the file transport service can be used to move either files or entire folders. The user can preferably drag and drop any file or folder into an output GUI area and have the file or folder transported to the remote computer using this feature of the present invention. That is, for example, the SIP component could set up a call, and the call could be used to send an entire CD-ROM, including its hierarchical directory structure, to a recipient's computer or appliance that is adapted to receive document type calls. This service is similar to an FTP service, and once it is integrated into a unified messaging environment in accordance with the present invention, it opens up new, much more convenient, secure, and efficient means of global document transfer than is possible with any presently available technology. The recipient computer could use filters and access controls to ensure it is not bombarded with large amounts of questionable, undesirable, or potentially harmful data.

The various above-described methods of the present invention can be executed in a client side computer. The method could provide a mailbox-style GUI having inboxes and outboxes. The method could also provide one or more types of data communications services, such as an email messaging service and/or a direct file transfer service. The method can provide a bandwidth control input that allows a user to throttle the amount of bandwidth used in at least one of a file upload to an email server, a file download from an email server, a direct point-to-point file transfer to a remote computer, and a direct point-to-point file transfer from a remote computer. For cases where source-to-target file transfers are to be used, the method can also provide a mechanism for receiving an input from a user indicative of a static application layer address and interacting with a network server to obtain a dynamic Internet address associated with the static application layer address. The dynamic Internet address can be a mobile IP address or an Internet address that can change, e.g., when a user moves, when power is cut from a cable modem service for a period of time, when a DHCP controller assigns a new IP address to a user, or when the IP address changes for any other reason. The method preferably also provides a mechanism for forking a background process, and in the background, causing a file to be transferred via a packet switched data network to the target computer in accordance with the bandwidth control input. The method optionally provides a mechanism for receiving a verification token back from the target computer indicating that the document has been received by the target computer. Finally, the method can provide a mechanism for indicating in an outbox entry of the unified messaging GUI that the file was successfully received at the target computer in response to receipt of the verification token.

The system 300/400 of the present invention may be implemented, in some embodiments, on a computer attached to the scanner rather than in the scanner itself. For example, if the scanner is attached to a PC, and the PC is attached to a network (e.g., a cable modem connection to the Internet), then PC-resident software can perform many of the same basic functions as described by the networked scanner provided it is equipped with scanner-to-email and/or scanner-to-FTP and/or scanner-to-DSS software, etc. It is noted that with presently available technologies, the scanner is typically directly cabled (or wirelessly via Bluetooth) to a single PC. However, the present invention allows the networked scanner to operate with multiple PCs, e.g., attached to the same LAN or VPN. Also, the optional smart card interface on the networked scanner provides very strong verification that a signatory to a document is the true signatory of the document. Alternatively, smart card readers and/or biometric scanners can be built directly into a PC, so that the scanned document or other types of files or directory sub-trees could be sent using the same basic protocols from networked PCs once the network scanner has scanned the document and made it available to a user via the network connection 125.

As discussed above, point-to-point file transfers often involve network server technology in different ways. For example, a user can use a network server such as an ASP (application service provider) to store his/her files and can enter a user name and password to access his/her file system. In some cases, the application service provider also supplies a set of application programs the user can access remotely. In accordance with the parent patent application, a user can enter a smart card into a machine in order to gain access to the user's personal file system.

To illustrate a method that can be used with the present invention, suppose user B maintains a server-side file system. For example, the server-side file system can be a file system on a corporate LAN file server, or may be an account, for example on an email server or any type of server that maintains disk space on behalf of a client. Consider an example where an application program on the networked scanner acts as an FTP client. If user A wants to send user B a document, user A can enter an FTP address associated with the server account maintained by user B. This FTP address can be selected from an address book or entered via the GUI 150 or the client 300 much like an email address can be entered using email client software. Now, instead of sending the document to user B via email, the document can be sent or uploaded directly to a file folder in user B's server-side file system account.

The various above-described methods of the present invention can also be executed in the network scanner 100. In one network scanner method, a set of authentication data is accepted to identify a particular user who is using the network scanner. A mailbox style GUI is presented including at least one inbox and at least one outbox. At least a direct file transfer service is provided for use with the inbox and the outbox. An input is received from a user indicative of a static application layer address. One or more sheets of paper are then scanned to create an image file. A connection is made via a path through the global Internet to a remote computer associated with the static application layer address and a file transfer session is thereby established with the remote computer. Finally, the image file is transmitted to the remote computer via the file transfer session. In some embodiments, the static application layer address is converted by an external server to a dynamic IP address. In other cases, the static address may be similar to a URL or a URI, and no SIP-type address translation or mobile-IP database lookup is needed. With any of the methods described herein, the static application layer address can be a fixed URL, URI, SIP address or a generalized multimedia call enabled email address that is published like a present day fax number and is constantly available to receive files such as scan-to-folder file transfers.

In accordance with an aspect of the present invention, a special FTP client is employed that behaves similar to an email client. When user B logs into his/her server-side ASP, he/she is notified of new documents in his/her in-box. Much like a unified messaging system, user B can look at his/her inbox and locate any files that have been uploaded directly into his/her inbox folder that are accessible for writing from external networked devices. User B can optionally limit access to his/her document in-box using an access control list, or any form of spam filter. Also, user B could set a filter to allow documents to be received from user A, but could further require they be hard-authenticated with a digital signature before they are accepted.

It is recognized by the present inventors that many corporations and SOHO environments use broadband connections. For example, in a SOHO environment, a user may use a cable modem connected to a WiFi router to provide service to a number of computers and networked peripherals. In an aspect of the present invention, a service such as the J2 Global Communications "GoToMyPC™" is used to access SOHO local area networks and computers. Such services allow users to access their home computer remotely from any location in the world via an Internet connection. In an aspect of the present invention, the scanner has installed therein a client side software application that acts as a client to an expanded inventive GoToMyPC™ type service used for user-to-user communications. The expanded service allows a first user to remotely access documents received via the scan-to-folder protocol and also allows the first user to write documents (including other types of files or directory system hierarchies) into a shared folder in a second user's computer.

Figure 5:
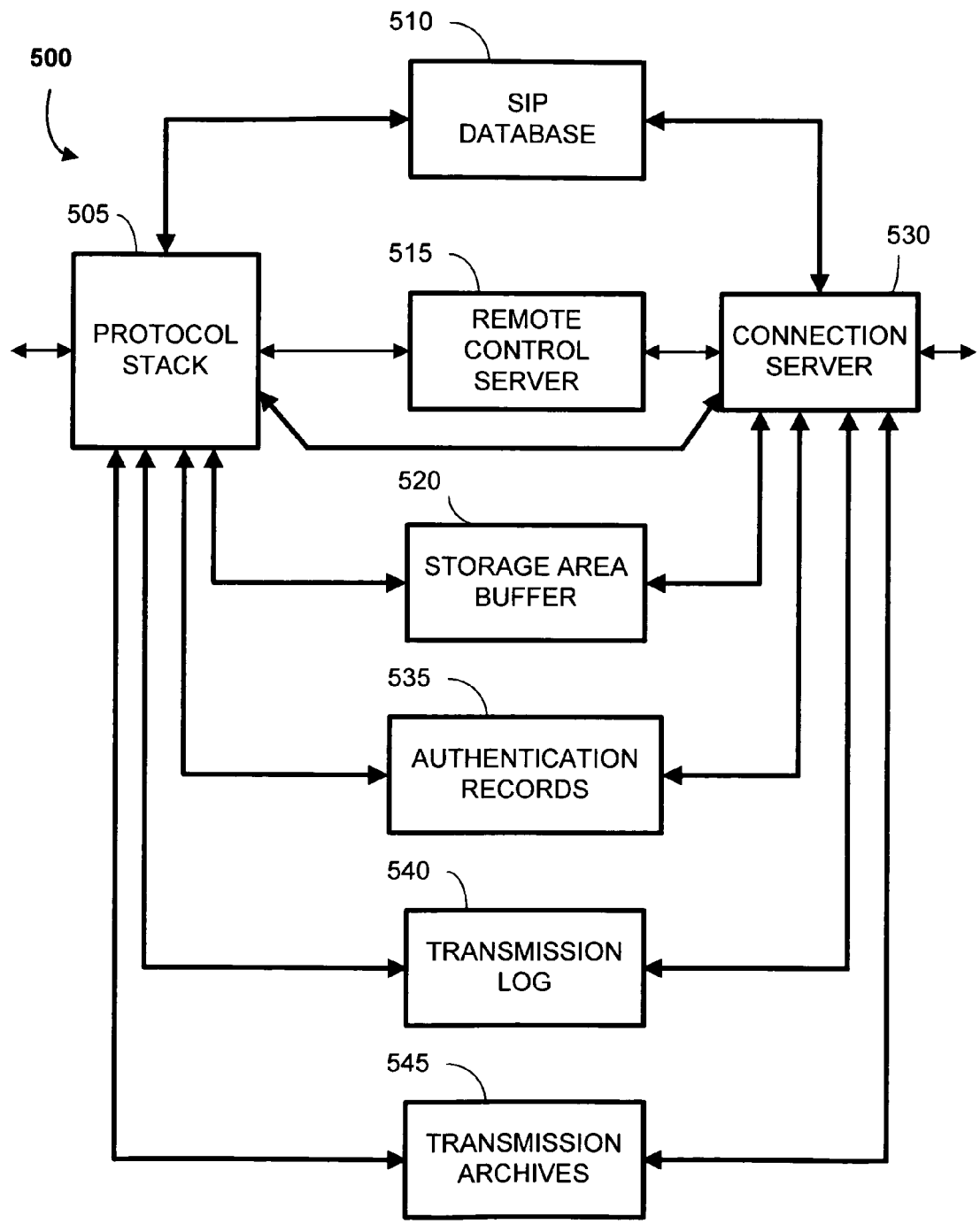
FIG. 5 is a block diagram illustrating a direct session server used in some embodiments to help transfer documents from a remote computer to a target computer.

Referring now to FIG. 5, a novel service termed herein a "direct session service" (DSS) is introduced. A DSS Server 500 includes a protocol stack 505 to interface with remote computer systems. The DSS server preferably includes or is coupled via an external network connection to a SIP database (not shown). The SIP database is used, for example, to map static application layer addresses similar to email addresses to Internet Protocol (IP) addresses or higher layer port or session addresses where a computer or computer resource or process can be found on a packet switched communication network such as the Internet. A connection server 530 is used to accept requests from remote computers and to control the various components of the DSS server to initiate connections to target computers, e.g., mobile computers or home computers whose IP address structure may change due to IP address reallocations or for other reasons. The DSS server can preferably be used to set up "document calls" using the SIP, H.323, SSL, or VPN protocols, or any other protocol that can be used to set up point-to-point connections across the Internet.

To support the concept of document calls, legacy fax-to-email servers can be replaced by a document call setup server in accordance with various server embodiments as represented by FIG. 5. Such servers preferably provide document buffering capabilities and remote access features and services for use when a recipient cannot receive a document call. This is much like a voice mail feature provided by current VoIP server technology. If a user is able to receive a document call, the document call server sets up a connection and the document is transported to the recipient using a document call. If, on the other hand, no user-controlled device is able to receive a document call, then the server sends the document to the equivalent of voice mail. For example, the document call setup server can store the document for a subscriber of the document calling service. The server can then send an email notification and/or a wireless notification message to the user's cell phone indicating that a document message has been received. The buffered document can be pushed to the user via email, a wireless multimedia messaging service (MMS), and/or can be stored by the server so that the user can log in via a web browser and download the received and stored document, using, for example, a multimedia messaging client in accordance with other aspects of the present invention. For further details of server embodiments see the discussion of FIG. 5.

In accordance with an exemplary embodiment of another aspect of the present invention, a server can implement a feature herein dubbed "document mail" as follows. A server first receives via the global Internet a request to set up a point-to-point document call from an originating network scanner device or client PC or handheld device. The document call is intended to be set up to a destination device that can belong to an organization or can be associated with a particular user. The request comprises an application layer address associated with an intended destination for the document call. Depending on the embodiment, the destination may correspond to a fixed destination computerized system, or may correspond to a follow-me type address associated with an individual user or an individual user's mobile IP device. The server next performs a database search to determine whether the destination device (or a device in use by the individual user) is presently connected to the global Internet. If the user or the destination device is connected to the Internet, the server looks up an Internet address associated with the destination device and couples it back to the originating device. This, possibly together with other protocol level handshaking, is used to provide the originating node with a destination address it can use to send a scanned document or other type of file through a "document call" (packet switched point-to-point transport path) to the destination device. If the database search is unsuccessful, the server preferably sends a message to the originating device to indicate the destination device could not be reached. In such cases, the server can also send back an indication to complete the document call to the server so that the server can store the document in "document mail," i.e., a designated buffer area from which the document can later be pushed to the destination user or from which the destination user can log in and download the document, for example, using a web browser.

In the type of embodiment described above, the server may optionally be configured to send back an Internet address corresponding to a server port adapted to receive document calls in a document mail system. Moreover, the document server can implement the receiver side of the method 200 and send back a receipt token to the document call origination device. When the user finally receives the document mail message with the document, a second token may preferably be sent from either the server or the recipient to the document call originating device in order to confirm that the user finally received the document. If the originating device is not connected to the Internet at the time the receipt token is generated, the server is preferably configured to attempt to determine when the originating device is again available and to push the receipt token to the originating device when the originating device is again connected to the Internet. In such embodiments, the server also may need to store a receipt token sent back from the destination in the buffer area until the originating device is available. In this case the document mail system functions similarly but in the reverse direction from the destination back to the origination point. If the origination point is not a subscriber to the server, the token may be sent via email and an email plug-in at the originating node may be used to log the receipt token in an outgoing document call log.

The DSS server 500 also includes or is coupled to a remote control server (RCS server) that communicates with a remote client and also with a target computer so that the remote client can, depending on the embodiment, store and/or retrieve documents to/from the target computer, much like a VPN access connection or a GoToMyPC™ type system. Also included is a storage area 520 used to buffer file transfers. This is used primarily for cases where the target computer cannot be reached, e.g., due to the computer being shut off, a power failure, or a temporary network connection dropout. The optional storage area is used to buffer received documents for such cases. The connection server 530 preferably periodically checks to see if the target computer is back online or receives a report from the target computer when the target computer is back online. The server 500 may be optionally configured to push the received document to the target computer once the connection server 530 is able to complete the connection to the target computer. Email and/or wireless multimedia messaging type notifications and user logon to a user mailbox for document access and downloading may also be supported. At the time the file is received at the target computer, a message is sent from the target computer back to the sending computer to confirm receipt. Email notification may also be used for this purpose.

The DSS server 500 is preferably implemented similar to the GoToMyPC™ server. However, instead of or in addition to going to the user's PC for document retrieval and access, the DSS server connects user A into user B's computer. In this manner, when user A scans the document, the document can be sent directly to user B's computer. An input folder is preferably provided to accept input documents from external users, and unified messaging type client software is preferably used to notify user B that the document was placed in his/her inbox. Alternatively, the document can be sent straight to a networked printer inside user B's internal network. A skilled artisan familiar with the implementation of the GoToMyPC™ service can readily appreciate that the same technology can be used to send documents to other subscribers' computers instead of allowing a particular user to access only his/her own PC. The application software on user B's computer preferably provides access control to only allow documents to be written in a particular inbox directory, and to limit access to authorized users on an authorized access list (e.g., designated users who are properly authenticated), as well as also preferably performing virus scanning and/or other harmful or malicious file detection functions to minimize the risk of harmful files infiltrating user B's computer due to files transferred from user A or other third parties via the DSS server.

As can be seen from the above, there are several ways scanned documents or other files or folders can be sent directly to users without using telephone lines at all, i.e., as email attachments, via direct FTP type connections to server side messaging accounts that can accept uploads from other users, uploads to a user's network side ASP-supplied file system via FTP (or other file transfer protocol), or can be sent directly to a user's computer via Internet transfer using a redirection and session initiation service like the user-to-user version DSS service described above. Various remote control-PC access systems can similarly be converted to data communication systems embodying various aspects of the present invention by allowing this type of software to be write-restricted to allow user A to write into user B's computer system or to a storage device located on a private LAN controlled by user B.

A SIP database 510 is used to set up a session pipe between endpoint computers. SIP services may involve mobile users as well. For example, a mobile user may connect a laptop in Texas, get on a plane and later plug in his/her laptop in Florida. A SIP server can be used to translate a static application layer address like eric@aol.com to a physical Internet address assigned by a DHCP or a mobile IP server for example. Using this technology, the network scanner can behave similar to a fax. A user can send a file directly to a destination computer, and directly to mobile and even wireless devices, e.g., using a mobile IP addressing scheme. This allows the present invention to provide direct point-to-point document transfer services like current fax technology. The recipient can be located anywhere and a single email address or email-type address can be used to locate the user, with the help of the SIP server, anywhere in the world. With broadband connections, many computers have an "always on" connection, and would thus be able to receive documents around the clock. To implement this functionality, the SIP server is used to set up a call between endpoints, and peer protocol entities such as the client software 400 in the endpoints are used to implement document call protocols as discussed herein.

Also optionally included in the server system 500 is a user authentication database 535. The user authentication database 535 is used to hold smart card information like user public and private key pairs and certified or trusted certificates so that users without smart cards can enter a user name and password and have the cryptographic algorithms that preferably execute on the smart card execute on the server instead. Alternatively, the cryptographic keys used for digital signatures can be sent via an encrypted path to a client side network scanner or PC so the digital encryption algorithms involving the user keys used to digitally sign the document are applied at the client side network scanner or PC. In some embodiments, the user authentication records may be used to augment the capabilities of users with smart cards, for example to update keys and to thereby seamlessly keep security data such as key from becoming old and out of date.

Also optionally supplied on the server system 500 is a server-side transmission log 540. The server side transmission log is supplied to allow a third party such as the server 500 keep track of all document transmissions sent and/or received at a given subscriber endpoint. This allows a subscriber to have a third party legal record log of all document transmissions and receptions so that a user can prove whether a document was sent or received (and by whom, including sender/receiver authentication data) should the need ever come up to resolve a dispute or misunderstanding and/or to adduce evidence for use in judicial, administrative, or regulatory proceeding.

Also optionally supplied on the server 500 is a transmission archive 545. The transmission archive is a storage service offered by the server 500 to keep track of some or all of the documents transmitted to and/or received at a given subscriber endpoint. The archive service allows subscribers to keep third party records of all document transfers, again, mainly for legal reasons, and future dispute settlement, but also for ease of record keeping and for secure archival purposes. A subscriber would have online access to the transmission log and would be able to obtain third party verification of any transmitted or received documents. In some cases, a subscriber may wish to mark certain documents for archive at transmission time or at some time after they are received. In such cases, the GUI in the client software 300 is preferably equipped with a way to mark documents to be transmitted for server-side archival. Also, the client-side GUI 305 also allows messages in the inbox to be marked for server-side archival. In such case, once a document is marked, it is sent to the server 500 for archival. If digital signatures are used, the document's digital signature and the message log entry can be maintained at the archive to maintain the record. In other cases all transmissions to/from an endpoint are archived. Documents received at the subscriber endpoint can be automatically uploaded to the server for archive, or a multicast protocol can be used to ensure the server and the endpoint both receive the same file.

When digital signatures are used, especially in combination with embedded time stamps, both the time of scanning and/or transmission time can be encoded into the document itself. Likewise, the identity of the scanning station, such as a scanner serial number, a fixed MAC address, or an application layer sending SIP address or other type of fixed network address corresponding to the sending station can be added to the document and the digital signature applied to the document containing the transmission stamp. Likewise, the sending station can digitally sign a document that has a time stamp included and both the sender's and recipient's network addresses appended. Also, the archive can store a copy of the return receipt so that the document is stored as is a receipt report that may include a cryptographic hash verifying receipt at the subscriber endpoint. All of these techniques and any sub-combination thereof may be used for implementing third party archival services at the server.

Because of the use of digital signatures and hard authenticated data, undeniable and trusted transmission logs and document archives may also be maintained at the subscriber endpoint itself. To lower storage requirements, instead of storing each transmitted and received document, only a document transmission log entry and a cryptographic hash of the document need be stored. In the future, using the transmission log entry and the cryptographic hash, a particular document can be positively matched to a corresponding transmission log entry without the need to store the entire document in the transmission archive. This technique can also be used for document archival at the server. That is, transmission log entries including a reduced cryptographic hash of the full documents are stored in the transmission log along with digitally signed receipt token so the transmission can be matched to the transmitted document in the future should the need arise to properly verify transmission and receipt.

Many other types of Internet appliance endpoint devices can be implemented to support the above and various other aspects of the present invention, new printers or other. For example, Internet appliances according to the present invention may be implemented with storage and with an "always on" broadband Internet connection so that they could have the capability to accept incoming documents essentially at all times. A networked computer could be used to view any documents that were accepted by the enhanced printer or standalone Internet appliance configured to accept incoming documents around the clock. Such an appliance could be integrated into the network scanner or could be used for document reception and possibly printing only. Alternatively, an email server or a messaging server could be used to eliminate the need to have a device that has an "always on" broadband connection to receive a document. These server systems could be implemented as email servers or could replace current generation fax-to-email servers.

In many cases a user will need special access privileges in order to be granted access across a firewall to perform a direct file transfer. For example, home users and large corporations alike may use firewall technology and access control technology to protect their local computing environment. As such, the network scanner or the client system 300/400 can use the smart card's hard authentication data and encryption data, together with the user entering his/her PIN, to create a VPN (virtual private network) connection to an access point of a private network. Once the user is authenticated, the user can enter a secured area via a VPN tunnel and can then have access to a protected file system. The user then can use the Windows Explorer™ type GUI to select a folder or a resource like a network printer and send the document thereto.

Note that the direct file transfer protocols can be useful because they provide additional privacy. However, direct session links and server based solutions can both be used. Because of the hard encryption offered by the use of smart card technology, security becomes much less of an issue, and the user can select a server side method or a remote computer access method or a document call to achieve the same result. The user can receive documents at a single application layer network address and can retrieve and access the documents from anywhere in the world. By integrating all the authentication, encryption, and access control technology into a seamless GUI client interface coupled with smart card technology, global document transfer and retrieval is greatly simplified and enhanced.

In another aspect of the invention, the scanner uses a combination of a direct file transfer protocol and email notification. In this embodiment, the direct file transfer techniques discussed above are used, and an email notification is sent to notify the user that a document has been inserted into his/her input file folder. Other types of notifications like pager notifications or messages sent to 3G or 4G wireless devices are contemplated.

Many of the client side software systems and methods described herein can be used for other reasons besides the scanning of documents. For example, if a user wished to send an entire CD worth of data to include a hierarchical directory structure to another user, the same types of user interfaces could be used to send the information. As such, a CD-ROM or DVD reader may be optionally included in the network scanner, and an entire CD-ROM or DVD of information can be sent to a recipient using the same user interfaces and protocols as described herein, or equivalents thereof. Moreover, such interfaces can be incorporated into client PC software to make PC-to-PC direct file transfers more convenient.

In some embodiments, the network scanner of the present invention may be configured to send a document as an email attachment or by means of a point-to-point file transfer to an email-to-fax server. This may be needed at times to interface with older fax machines. The GUI on the scanner preferably allows a user to enter text into a subject field, which could include a field for entry of a destination fax number. When the scanned document is received at the email-to-fax server, the email-to-fax server makes an outbound fax call to a legacy fax machine. While this embodiment is not preferred, it may be useful while the technology transition from legacy fax machines to the current technology progresses.

FIGS. 1-5 and the discussion thereof teach and illustrate a class of methods that can be implemented on client computers, network scanners, and network servers. To help better understand this class of methods, several explicit variations are illustrated in the paragraphs below.

A method for use in a network scanner involves accepting a set of authentication data to identify a particular user who is using the network scanner and offering a mailbox style GUI including at least one inbox and at least one outbox to the user. Also offered is at least a direct file transfer message type for use with the inbox and the outbox. The method receives a VPN logon address input from a user indicative of a static application layer address. The method also involves interacting with a remote VPN logon portal to obtain remote VPN access to one or more resources located on a private network to include a particular file folder associated with a recipient inbox. Next, the method establishes a VPN connection tunneled across the global Internet to a remote computer associated with the static application layer address and creates a file transfer session through the VPN tunnel to the remote computer. Either before or after creating the connection, typically before, one or more sheets of paper are scanned to create an image file. The image file is then transmitted to the remote computer via the file transfer session. The file can be transferred to an inbox storage area associated with a recipient user or organization at the remote computer.

A similar method for use in a network scanner involves accepting a set of authentication data to identify a particular user who is using the network scanner. The same GUI mailboxes and direct file transfer services are provided. A remote computer system logon address is received from a user indicative of a static application layer address. This could be a URL, URI, or a SIP address, for example. The method also involves interacting with a remote control server across the global Internet to obtain remote access to one or more resources located on a private network to include a particular file folder associated with a recipient inbox. Again, the method also involves scanning a document to generate an image file (usually, but not necessarily, before the network connection is set up), and transmitting the image file to the remote computer via the remote control server.

A similar method is the same as the above, except the static application layer address corresponds to the remote control server, whereby a destination address is provided to the remote control server so that the remote control server can identify and access a recipient's computer system in order to gain access thereto for purposes of carrying out the remaining steps of the method.

Another version of the method for use in a network scanner involves accepting a set of authentication data to identify a particular user who is using the network scanner, scanning one or more sheets of paper to create an image file, and offering a similar mailbox style GUI and the direct file transfer services as described above. This version of the method involves receiving from the particular user an application layer address associated with a remote computer reachable through a path across the global Internet. The destination of the path is defined by the application layer address. Again, the method also involves transmitting the image file to the remote computer via the path across the global Internet.

In any of the methods above, the steps 225, 240 and 250 may optionally be employed to apply authentication (e.g., a digital signature) and/or encryption to the image file, to receive a receipt token (possibly generated via cryptographic hashing to confirm integrity), and to mark the outbox of the GUI mailbox system to indicate when the file was received by the destination computer and/or opened by the intended recipient. Depending on the particular implementation of the inventive method, an intermediate server may be involved for static-to-dynamic address translation or remote control access to a home computer or private network. Also, static addresses like URLs and URIs and other types of application layer addresses may be used with the help of application layer to network and transport layer lookups (from client side tables or server side databases) to locate the destination computer on the network and to set up a point-to-point transport path thereto across the Internet, an intranet, or some other type of network like a wireless data network or a Mobile IP network.

As discussed above, any of the scanner methods described herein can also be implemented on a combination of the network scanner 100 and a network connected PC running client side software. For example, the PC can have a built-in smart card reader, and the user identification and scanner related steps can be performed at the scanner and the strong authentication steps and the transmission and protocol interaction steps can be performed at the networked PC. Also, in any of the methods above, user authentication can be substituted with user identification if a lower level of security is acceptable. Again, the authentication steps described herein can be performed at the PC and PC smart card reader prior to transmission as opposed to being performed by the client that operates on the scanner.

Figure 6:
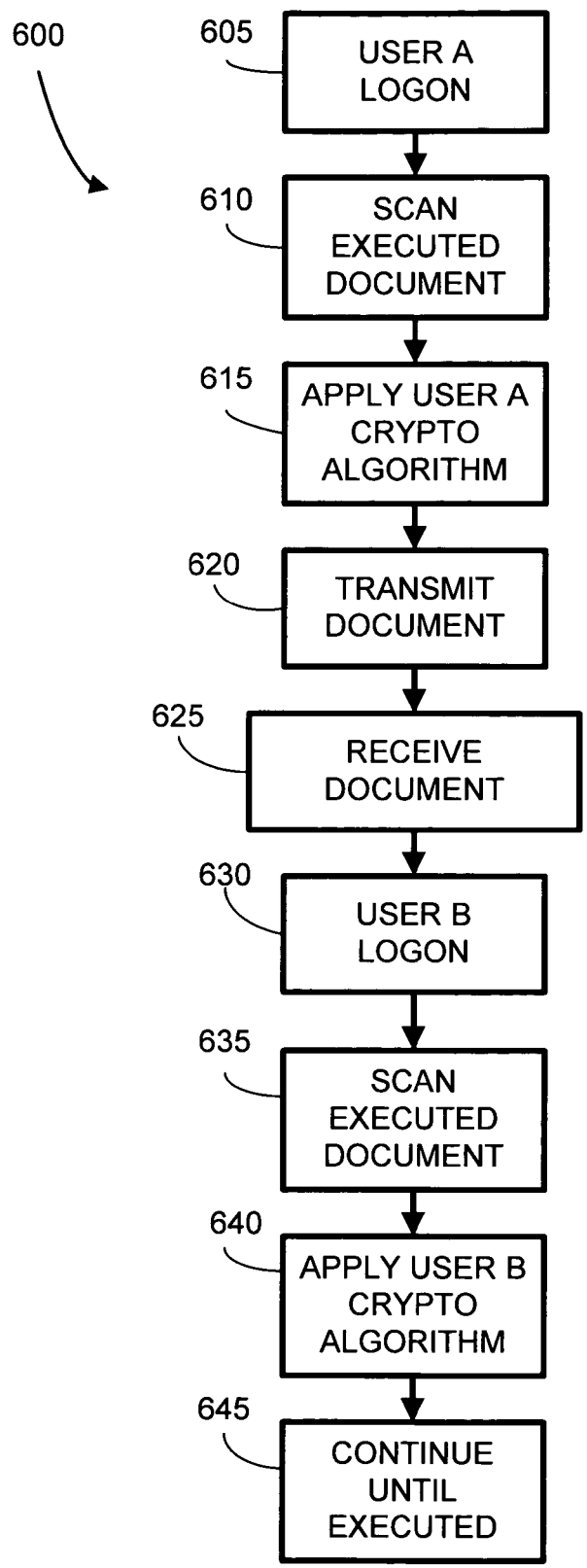
FIG. 6 shows a flow chart of a network application program used to remotely execute legally binding contracts and agreements between two or more parties.

Referring now to FIG. 6, a method 600 according to another embodiment of the present invention is illustrated in flow chart form. In a first step 605, a first party (user A) performs a logon procedure similar to steps 205, 210, at a network scanner. Preferably, user A inserts a smart card into the scanner in the step 205. Next, a legally binding signed/executed document is inserted into the paper feeder and scanned, in a step 610. In a step 615, a set of one or more cryptographic algorithms are then applied to the document and a digital signature (embedded in the document as a cryptographic hash function and/or applied to each page as printable digital watermark or 2D bar code, for example) is applied to the document to verify the user identity and/or encrypt the document according to a cryptographic system such as public-private key cryptography. The encryption algorithms may be preferably applied by streaming the document (or file or folder) to and from (through) the smart card as previously described.

Next, in a step 620, the document is transmitted to a computer or email account associated with a second party (user B). In a step 630, user B performs a similar logon procedure as user A did in step 605. Next, user B prints out either the whole document or just the signature page and signs it and rescans one or more pages, at step 635. Next, the scanned document is reassembled and user B's cryptographic algorithm(s) are applied to authenticate and/or encrypt the document according to user B's cryptographic information 640 similar to the procedure described above with respect to user A. At this juncture, the document contains both user A and user B's electronic signatures and each page optionally contains a digital watermark or 2D cryptographic bar code. In a step 645, if applicable, the document is transmitted to a next party and the same basic procedure (steps 625-645) is repeated until all signatories have executed the document.

Further elaboration of this method is made with reference to the following example. The smart card preferably includes a digital signature application program that is particularly adapted to facilitate execution of legal documents having judicially-acceptable evidentiary value. For example, suppose a contract is to be signed by three parties. Once the parties have agreed on the contract, a first party signs the contract and uses the network scanner to send it to a second party. The network scanner sends the document to the user's smart card where private keys are applied to generate and apply a digital signature to the entire document, and to optionally add the digital watermark or 2D bar code of the first party in a footer. Next, the authenticated signed document is transmitted to a network address such as an email address or a special application layer address like an FTP address that corresponds to a second party to the contract. The second party preferably launches a local copy of the inventive application program. The second party then prints out the signature page, signs the signature block, and scans the signature page back in. Now the signature page has two signatures. The application program then preferably adds the signature page to the original document. The second user's smart card and PIN are entered through the second user's smart card so his/her digital signature and optional digital watermarks can be added to the document. Next, the second user transmits the electronic document to the third user who repeats the process and sends the fully executed document back to the first and second parties. In this manner, even large, multi-party contracts can be efficiently executed in an electronic manner, and the final document is much more secure than even a document that has an original signature of every party on every page.

In a preferred embodiment, the cryptographic algorithms are applied by a processor located on each user's smart card. The document is either sent in bulk or is streamed to the smart card and processed in blocks or sequentially due to the potentially limited storage on the smart card. In some cases, multiple passes may be needed to apply the cryptographic algorithms to the entire document, but block applications of the encryption algorithm to portions of the document work just as well and are more efficient. In this manner, the private key information never leaves the smart card. At the end of the process, a perfectly secure document exists that is much more secure than a fax executed document and is even harder to forge than a document with original pen and ink signatures. While the baseline cryptographic technology to implement such a document execution system has existed for some time, until now the lack of an integrated solution for document input, authentication, transmission and output has been lacking, and consequently, the existing cryptographic technology has not achieved widespread acceptance, and fax and regular mail or courier services are still regularly used to execute legal documents.

In another aspect of the invention, the concept of a networked printer is expanded to provide new services. A networked printer may be assigned an email address, an FTP address, or any other type of application layer address. In this aspect of the invention, the networked printer may be configured to print out received image files sent by networked scanner devices. For example, a user may scan a document and instead of sending it as an email attachment to a user's email address, the user may send it to a special address analogous to a fax telephone number. A user inserts the document into the network scanner, the document is scanned, and the destination address corresponds to a networked printer located at a remote home or office. In this manner, a fax-type message can be received and printed, for example, by a printer attached to a router in someone's home or at an office.

In another aspect of the present invention, a user or corporate entity may have a published address that serves the same purpose as a fax number. For example, an address such as "documentReceipt@company.com" may be used similar to a fax number. If an image file is received at this address, it can be automatically routed to a network printer located in the "company.com" domain and printed out. However, it is recognized that unwanted spam uses up paper and toner resources. Therefore, in accordance with an aspect of the present invention, anti-spam or filtering software could be used to ensure that only image files received from a list of pre-approved sending addresses and/or from strongly authenticated individuals would be automatically printed. (Of course, it will be readily appreciated that many other anti-spam and/or filtering criteria could be additionally or alternatively employed.) All other received documents could be routed for electronic retrieval and printed only if desired. While presently available fax machines have no defense against fax-based spam advertising, the present invention allows any type of spam filter to be used. Also, with the present invention, received documents need not be printed as soon as they are received, but could be stored electronically and viewed on a computer screen and only printed out if a paper copy is needed. Accordingly, the network scanner of the present invention greatly reduces the need to make paper copies when compared to analog fax based technology and is another step toward the longstanding goal of the paperless office.

Although the present invention has been described with reference to specific embodiments, other embodiments may occur to those skilled in the art without deviating from the intended scope. Therefore, it is to be understood that the invention herein encompasses all such embodiments which do not depart from the spirit and scope of the invention as defined in the appended claims.

What is claimed is:

1. A method implemented by a programmed network-server based computer system, the method comprising:

the programmed network-server based computer system receiving, on behalf of an intended recipient, an authenticated image file from a stand-alone network scanner device via a path across a global Internet, wherein the authenticated image file includes particular scanned document data sufficient to enable reproduction of a particular scanned document originally scanned by a particular sending user using the stand-alone network scanner device, and further includes authentication data that identifies the particular sending user as having authenticated himself/herself at the stand-alone network scanner device as being associated with the particular scanned document;

the programmed network-server based computer system storing archival data associated with the authenticated image file, wherein the archival data is accessible at a future date and time in order to enable verification at the future date and time that the particular sending user is associated with the authenticated image file, to enable reproduction of the particular scanned document, and to provide a verification that the reproduction of the particular scanned document is substantially identical to the particular scanned document as it was originally scanned by the particular sending user using the stand-alone network scanner device;

the programmed network-server based computer system transmitting information related to the authenticated image file to a remote computerized device associated with the intended recipient;

the programmed network-server based computer system providing a first remotely accessible user interface for use by the particular sending user, to enable the particular sending user to access the particular document; and the programmed network-server based computer system providing a second remotely accessible user interface for use by the intended recipient to access the particular document.

2. The method as set forth in claim 1, wherein the information related to the authenticated image file comprises the authenticated image file itself.

3. The method as set forth in claim 2, wherein the stand-alone network scanner device employs a direct file transfer protocol for transmitting the authenticated image file to the programmed network server-based computer system.

4. The method as set forth in claim 2, wherein the archival data further enables verification at the future date and time that the authenticated image file was received by the remote computerized device at a particular reception date and time.

5. The method as set forth in claim 4, wherein the remote computerized device at least in part generates remote computerized device receipt confirmation data by computing a cryptographic hash function on the authenticated image file, and the remote computerized device sends the remote computerized device receipt confirmation data back to the programmed network server-based computer system.

6. The method as set forth in claim 5, wherein the archival data further enables verification at the future date and time that the authenticated image file was opened for viewing by the intended recipient at a particular viewing date and time, and the archival data is accessible to the particular sending user via the first remotely accessible user interface.

7. The method as set forth in claim 1, wherein the transmitting of the authenticated image file is performed only after receipt by the programmed network-server based computer system of authentication credentials of the intended recipient, and confirmation of a validity thereof.

8. The method as set forth in claim 1, wherein the programmed network-server based computer system provides a subscription-based archival service.

9. The method as set forth in claim 1, wherein the programmed network-server based computer system provides a subscription-based archival service, and the particular sending user and the intended recipient are subscribers to the subscription-based archival service.

10. The method as set forth in claim 1, wherein the authenticated image file is encrypted.

11. The method as set forth in claim 10, wherein the archival data further enables verification at the future date and time that the authenticated and encrypted image file was received by the remote computerized device at a particular reception date and time.

12. The method as set forth in claim 1, wherein the remote computerized device is a personal computer associated with the intended recipient.

13. The method as set forth in claim 12, wherein the remote computerized device comprises a networked computer coupled via a virtual private network tunnel through the global Internet to the programmed network-server based computer.

14. The method as set forth in claim 1, wherein the remote computerized device is a second stand-alone network scanner device associated with the intended recipient.

15. The method as set forth in claim 1, wherein the remote computerized device comprises a networked computer coupled to a local area network accessible to the global Internet via a firewall.

16. The method as set forth in claim 1, wherein the remote computerized device is an Internet appliance endpoint device that provides a network scanner function, a storage function, a printer function, an inbound document call function, an outbound document call function, and a client-server network communication function.

17. A method implemented by a programmed network-server based computer system, the method comprising:
the programmed network-server based computer system providing a plurality of remotely accessible storage areas into which a plurality of remote stand-alone network scanner devices can transmit scanned image files, wherein each respective one of the plurality of the remotely accessible storage areas is remotely addressable in accordance with a respective static application layer address associated with a respective user;
the programmed network-server based computer system receiving, from a particular one of the plurality of stand-alone network scanner devices, a request to initiate a point-to-point document call, wherein the request includes a particular static application layer address associated with an intended recipient;
the programmed network-server based computer system performing a database translation to convert the particular static application layer address associated with the intended recipient into an active network address that serves as an endpoint address for use in the point-to-point document call;
the programmed network-server based computer system establishing, with the particular one of the plurality of stand-alone network scanner devices, the point-to-point document call via a path across a global Internet, and receiving, via the point-to-point document call, from the particular one of the plurality of stand-alone network scanner devices, an authenticated image file;
the programmed network-server based computer system storing the authenticated image file into a respective storage area associated with the intended recipient, wherein the authenticated image file includes a particular scanned document and cryptographic data sufficient to verify that the particular scanned document has not been altered since it was originally scanned by a particular sending user using the particular one of the plurality of stand-alone network scanner devices, and the authenticated image file further includes authentication data that identifies the particular sending user as having authenticated himself/herself at the particular one of the plurality of stand-alone network scanner devices as being associated with the particular scanned document; and
the programmed network-server based computer system storing archival data associated with the authenticated image file, wherein the archival data identifies at least the particular sending user, the intended recipient and the date and time the authenticated image file was received by the programmed network-server based computer system.

18. The method as set forth in claim 17, wherein the point-to-point document call is established in accordance with a session initiation protocol (SIP).

19. The method as set forth in claim 18, wherein the static application layer address is a SIP address.

20. The method as set forth in claim 18, wherein the static application layer address is a telephone number.

21. The method as set forth in claim 18, wherein the programmed network-server based computer system includes a SIP server function.

22. The method as set forth in claim 17, further comprising:
the programmed network-server based computer system transmitting the authenticated image file to a remote computerized device associated with the intended recipient, wherein the programmed network-server based computer system provides a subscription-based archival service to at least one member of the group consisting of the particular sending user and the intended recipient.

23. The method as set forth in claim 22, wherein the programmed network-server based computer system performs the transmitting at a time subsequent to its receipt of the authenticated image file from the particular one of the plurality of stand-alone network scanner devices, in response to a detection that the remote computerized device has become reachable via the global Internet.

24. The method as set forth in claim 22, wherein the programmed network-server based computer system performs the transmitting at a time subsequent to its receipt of the authenticated image file from the particular one of the plurality of stand-alone network scanner devices, in response to a request to access the authenticated image file, wherein the request is transmitted from the intended recipient via the remote computerized device and via a path through the global internet to the programmed network-server based computer system.

25. The method as set forth in claim 22, wherein the remote computerized device corresponds to an Internet appliance endpoint device that provides a network scanner function, a storage function, a printer function, an inbound document call function, an outbound document call function, and a client-server network communication function.

26. The method as set forth in claim 25, further comprising:
the remote computerized device causing the particular scanned document to be automatically printed in response to receipt of the authenticated image file.

27. The method as set forth in claim 22, wherein the archival data further enables verification at a future date and time that the authenticated image file was received by the remote computerized device for use by the intended recipient at a particular reception date and time, and the archival data is accessible to the particular sending user via a first remotely accessible user interface.

28. The method as set forth in claim 27, wherein the remote computerized device at least in part generates remote computerized device receipt confirmation data by computing a cryptographic hash function on the authenticated image file, and the remote computerized device sends the remote computerized device receipt confirmation data back to the programmed server-based computer system.

29. The method as set forth in claim 27, wherein the remote computerized device sends a particular scanned document opening confirmation back to the programmed server-based computer system.

30. The method as set forth in claim 29, wherein the archival data further enables verification at a future date and time that the authenticated image file was opened for viewing by the intended recipient at a particular viewing date and time based upon the particular scanned document opening confirmation, and the archival data is accessible to the particular sending user via the first remotely accessible user interface.

31. The method as set forth in claim 17, wherein the programmed network-server based computer system provides a subscription-based archival service.

32. The method as set forth in claim 17, wherein the programmed network-server based computer system provides a subscription-based archival service, and the particular sending user and the intended recipient are subscribers to the subscription-based archival service.

33. A method implemented by a programmed network-server based computer system, the method comprising:

the programmed network-server based computer system providing a plurality of remotely accessible storage areas into which a plurality of remote stand-alone network scanner devices can transmit scanned image files, wherein each respective one of the plurality of the remotely accessible storage areas is remotely addressable in accordance with a respective static application layer address associated with a respective user;

the programmed network-server based computer system receiving, from a particular one of the plurality of stand-alone network scanner devices, a request to initiate a point-to-point document call to an intended recipient, wherein the request includes a particular static application layer address associated with an intended recipient;

the programmed network-server based computer system determining whether the point-to-point document call can be completed to a remote computerized device associated with the intended recipient, via a path across a global Internet;

if the determining provides an affirmative result, the programmed network-server based computer system sending to the particular one of the plurality of stand-alone network scanner devices an active network address indicative of where the remote computerized device can currently receive point-to-point document calls via the global Internet, to thereby support the ability of the particular one of the plurality of stand-alone network scanner devices and the remote computerized device to establish the point-to-point document call;

if the determining provides a negative result, the programmed network-server based computer system receiving via a path across the global Internet, from the particular one of the plurality of stand-alone network scanner devices, an authenticated image file, and the programmed network-server based computer system storing the authenticated image document into a particular one of the remotely accessible storage areas associated with the static application layer address of the intended recipient, wherein the authenticated image file includes a particular scanned document and cryptographic data sufficient to verify that the particular scanned document has not been altered since it was originally scanned by a particular sending user using the particular one of the plurality of stand-alone network scanner devices, and the authenticated image file further includes authentication data that identifies the particular sending user as having authenticated himself/herself at the particular one of the plurality of stand-alone network scanner devices as being associated with the particular scanned document;

the programmed network-server based computer system storing archival data associated with the authenticated image file, wherein the archival data identifies at least the particular sending user, the intended recipient and the date and time the authenticated image file was received by the programmed network-server based computer system; and the programmed network-server based computer system transmitting the authenticated image file to the intended recipient at the remote computerized device.

34. The method as set forth in claim 33, wherein the programmed network-server based computer system performs the transmitting at a time subsequent to its receipt of the authenticated image file from the particular one of the stand-alone network scanner devices in response to a detection that the remote computerized device has become reachable via the global Internet.

35. The method as set forth in claim 34, wherein the remote computerized device corresponds to a second particular one of the plurality of stand-alone network scanner devices, and the second particular one of the plurality of stand-alone network scanner devices is associated with the intended recipient.

36. The method as set forth in claim 34, wherein the remote computerized device corresponds to an Internet appliance endpoint device that provides a network scanner function, a storage function, a printer function, an inbound document call function, an outbound document call function, and a client-server network communication function.

37. The method as set forth in claim 36, further comprising the remote computerized device causing the scanned document to be automatically printed in response to receipt of the authenticated image file.

38. The method as set forth in claim 33, wherein the programmed network-server based computer system performs the transmitting at a time subsequent to its receipt of the authenticated image file from the particular one of the stand-alone network scanner devices in response to a request received from the remote computerized device.

* * * * *